(12) United States Patent
Hill et al.

(10) Patent No.: US 8,983,973 B2
(45) Date of Patent: Mar. 17, 2015

(54) SYSTEMS AND METHODS FOR RANKING POINTS OF INTEREST

(71) Applicant: MapQuest, Inc., Denver, CO (US)

(72) Inventors: Simon Hill, Englewood, CO (US); Emilie Laffray, Croydon (GB); Adam Risser, Lititz, PA (US); Brian Quinion, Sheffield (GB)

(73) Assignee: MapQuest, Inc., Denver, CO (US)

(*) Notice: Subject to any disclaimer, the term of this patent is extended or adjusted under 35 U.S.C. 154(b) by 83 days.

(21) Appl. No.: 13/650,657

(22) Filed: Oct. 12, 2012

(65) Prior Publication Data

US 2013/0103697 A1 Apr. 25, 2013

Related U.S. Application Data

(60) Provisional application No. 61/546,526, filed on Oct. 12, 2011.

(51) Int. Cl.
*G06F 17/30* (2006.01)
*G01C 21/20* (2006.01)
*G01C 21/36* (2006.01)
*G09B 29/00* (2006.01)
*G06Q 10/10* (2012.01)
*G06Q 50/00* (2012.01)

(52) U.S. Cl.
CPC ......... *G06F 17/30312* (2013.01); *G01C 21/20* (2013.01); *G01C 21/3679* (2013.01); *G06F 17/30241* (2013.01); *G09B 29/007* (2013.01); *G06Q 10/101* (2013.01); *G06Q 50/01* (2013.01)
USPC .......................................................... 707/748

(58) Field of Classification Search
CPC .......... G06F 17/30241; G06F 17/3087; G06F 17/308873; G06F 17/3053; G06F 17/30873
USPC .......................................................... 707/748
See application file for complete search history.

(56) References Cited

U.S. PATENT DOCUMENTS 8,073,845 B2 * 12/2011 Homma et al. ................ 707/723
8,433,512 B1 * 4/2013 Lopatenko et al. ........... 701/426

(Continued)

FOREIGN PATENT DOCUMENTS

WO WO 2009/151928 A2 12/2009

OTHER PUBLICATIONS

An Extended European Search Report issued by the European Patent Office on Feb. 20, 2013, in corresponding European Application No. 12007099.0 (9 pages).

*Primary Examiner* — Rehana Perveen
*Assistant Examiner* — Tiffany Thuy Bui
(74) *Attorney, Agent, or Firm* — Finnegan, Henderson, Farabow, Garrett & Dunner, L.L.P.

(57) ABSTRACT

Systems and methods are provided for ranking points of interest (POIs). According to one implementation, a computer-implemented method may be provided that includes receiving geographic information from a user device, and selecting a plurality of points of interest within the geographic region. The method may also include generating an initial ranking of the selected points of interest based on voting information received from the user device, viral input from a user's social network, and/or additional input based on searches for maps and travel directions for traversing a route. In addition, the method may include calculating a modified ranking of the selected points of interest.

35 Claims, 17 Drawing Sheets

(56) References Cited

U.S. PATENT DOCUMENTS

| | | | |
|---|---|---|---|
| 8,620,579 B1* | 12/2013 | Upstill et al. | 701/426 |
| 2002/0055926 A1 | 5/2002 | Dan et al. | |
| 2006/0287810 A1* | 12/2006 | Sadri et al. | 701/200 |
| 2007/0032942 A1 | 2/2007 | Thota | |
| 2010/0076968 A1* | 3/2010 | Boyns et al. | 707/732 |
| 2010/0305855 A1* | 12/2010 | Dutton et al. | 701/213 |
| 2011/0313657 A1* | 12/2011 | Myllymaki et al. | 701/208 |
| 2012/0197714 A1* | 8/2012 | Beyeler et al. | 705/14.49 |
| 2012/0209861 A1* | 8/2012 | Narasimha et al. | 707/750 |
| 2012/0259706 A1* | 10/2012 | Lobaza et al. | 705/14.62 |
| 2013/0073988 A1* | 3/2013 | Groten et al. | 707/741 |

\* cited by examiner

← 700

| | |
|---|---|
| Alcoholism Information & Treatment Ctrs | 839902 |
| Antique Dealers | 593202 |
| Bankruptcy Service | 729953 |
| Bars | 581301 |
| Body Piercing | 729979 |
| Book Stores | 594201 |
| Cabarets | 581306 |
| Check Cashing Service | 609903 |
| Clothing-Used | 593205 |
| Clubs | 864108 |
| Cocktail Lounges | 581303 |
| Comedy Clubs | 581307 |
| Costumes | 569905 |
| Counselors-Drug Alcohol & Nicotine | 832293 |
| Credit Restoration | 729958 |
| Debt Adjusters | 729929 |
| Debt Buyers | 615305 |
| Drug Abuse & Addiction Info & Treatment | 839901 |
| Ear Piercing Service | 729928 |
| Entertainers-Adult | 792227 |
| Ezmoney | 614113 |
| Flea Markets | 593218 |
| Foreclosure Assistance | 616202 |
| Junk-Dealers | 593215 |
| Laundries | 721101 |
| Laundries-Self Service | 721501 |
| Legal Clinics | 811114 |
| Lingerie | 563210 |
| Liquor Stores | 592102 |
| Massage | 729963 |
| Mobile Homes-Parks & Communities | 651501 |
| Night Clubs | 581304 |
| Palmists | 729936 |
| Pawn Shops | 593229 |
| Permanent Make-Up | 729973 |
| Pubs | 581305 |
| Remodeling Loans | 616305 |
| Salvation Army Thrift Store | 593222 |
| Structured Settlement Buyers | 616304 |
| Student Housing | 702106 |
| Tanning Salons | 729944 |
| Tattoos & Piercing | 729943 |
| Used Merchandise Stores | 593230 |
| Variety Stores | 533101 |
| Video & DVD Rental | 784102 |

FIG. 7A

| Population | Reward |
|---|---|
| 0-10% | 0% |
| 10%-20% | 5% |
| 20%-30% | 15% |
| 30%-40% | 30% |
| 40%-50% | 30% |
| 50%-60% | 30% |
| 60%-70% | 30% |
| 70%-80% | 30% |
| 80%-90% | 30% |
| 90%-100% | 30% |

| Population | Reward |
|---|---|
| 0-10% | 5% |
| 10%-20% | 10% |
| 20%-30% | 15% |
| 30%-40% | 25% |
| 40%-50% | 30% |
| 50%-60% | 30% |
| 60%-70% | 40% |
| 70%-80% | 40% |
| 80%-90% | 40% |
| 90%-100% | 40% |

*900*

| POI Category | SIC | POI Count & Weight | | | | | | | | | |
|---|---|---|---|---|---|---|---|---|---|---|---|
| | | POI incidence | 1st | 2nd | 3rd | 4th | 5th | 6th | 7th | 8th | 9th |
| Grocery | 541105, 581209, 546102, 549915 | | 4.0 | 1.0 | | | | | | | |
| Dining Out | 581208, 581222, 581206, 581301, 581228, 581219, 581304, | 0.7 | 0.4 | 0.3 | 0.2 | 0.2 | 0.2 | 0.2 | 0.2 | 0.1 |
| Shopping (exl. Grocery) | 541103, 565101, 594712, 562101, 581209, 531104, 566101, | 0.6 | 0.5 | 0.3 | 0.3 | 0.3 | | | | |
| Hanging Out | 581228, 581203, 581304, 581214, 594201, 599969, 549915 | 1.5 | 1.3 | 1.0 | 0.8 | | | | | |
| Banks | 602101 | | 1.0 | | | | | | | | |
| Parks | 799951 | | 3.0 | 2.0 | 1.0 | | | | | | |

| Distance (mi.) | Decay (as % of original score) |
|---|---|
| 0.00 | 100% |
| 0.05 | 100% |
| 0.10 | 100% |
| 0.15 | 100% |
| 0.20 | 100% |
| 0.25 | 100% |
| 0.30 | 100% |
| 0.35 | 100% |
| 0.40 | 100% |
| 0.45 | 100% |
| 0.50 | 100% |
| 0.55 | 98% |
| 0.60 | 92% |
| 0.65 | 87% |
| 0.70 | 81% |
| 0.75 | 76% |
| 0.80 | 70% |
| 0.85 | 64% |
| 0.90 | 59% |
| 0.95 | 53% |
| 1.00 | 40% |
| 1.05 | 35% |
| 1.10 | 30% |
| 1.15 | 25% |
| 1.20 | 20% |
| 1.25 | 15% |
| 1.30 | 10% |
| 1.35 | 5% |
| 1.40 | 5% |
| 1.45 | 5% |
| 1.50 | 0% |

FIG. 9B

Intersection Density            ← 940
over 200                no penalty
150-200                 2% penalty
120-150                 4% penalty
90-120                  6% penalty
60-90                   8% penalty
under 60                12% penalty

FIG. 9C

Average block length (in meters)   ← 960
under 120m              no penalty
120-150m                2% penalty
150-165m                4% penalty
150-180m                6% penalty
165-180m                8% penalty
180-195m                12% penalty
over 195m               15% penalty

| Area in sq. mi | Number of hotspots | Penality % |
|---|---|---|
| >5 | <=2 | -30% |
| >5 | <=3 | -20% |
| >5 | <=4 | -10% |
| >5 | <=5 | -5% |
| >3 | <=2 | -20% |
| >3 | <=3 | -10% |
| >1.5 | <=4 | -5% |
| >1.5 | <=2 | -10% |
| >1.5 | <=3 | -5% |
| >.5 | <=1 | -10% |

FIG. 9E

990 n= number of penalties encountered +1

| Road Class | Penalty/Reward |
|---|---|
| motorway | -20% / n |
| primary | -10% /n |
| primary_link | -10% /n |
| trunk | -15% / n |
| trunk_link | -15% /n |
| secondary | -7% / n |
| residential | +20% / n |
| path | +20% /n |
| pedestrian | +40% / n |

FIG. 9F

SYSTEMS AND METHODS FOR RANKING POINTS OF INTEREST

CROSS-REFERENCE TO RELATED APPLICATIONS

This application claims the benefit of priority to U.S. Provisional Patent Application No. 61/546,526, filed Oct. 12, 2011, the entire disclosure of which is expressly incorporated herein by reference in its entirety.

BACKGROUND

1. Technical Field

The present disclosure generally relates to techniques for ranking points of interest disposed within geographic regions of interest to a user. More particularly, and without limitation, the present disclosure relates to systems and methods for ranking points of interest based on, for example, input from a user, input from a social network associated with the user, and/or input from prior searches for maps and driving directions.

2. Background Information

Today, many sources of information exist to aid the general public in evaluating points of interest (POIs), such as restaurants, retailers, and various other attractions. For example, the general public may draw upon user-generated or editorially-generated ratings and reviews of the POIs to gain information on the quality of the POIs. However, such ratings and reviews are often limited in their ability to provide accurate and location-specific information on the POIs.

For example, a large number of ratings and/or reviews of a single POI may be needed to obtain a statistically-significant sample. However, characteristically low levels of user participation in the review process can render a statistically-significant sample difficult to obtain. Furthermore, ratings and reviews may be skewed towards an extremist bias, which renders these ratings and reviews effectively useless to the general public. Moreover, such ratings and reviews are often insufficiently local, as they pay little attention to a relative value of one POI as opposed to another POI within a local context of choice.

In addition to the above techniques, the public may also obtain information on the quality of POIs from one or more user-generated or editorially-generated leaderboard-style "Best Of" rankings of POIs. These rankings, however, are also generally of limited use to the consuming public. For example, these generated rankings often range over too wide a population of POIs, and thus obscure POIs that may be of great quality in a relatively small niche area. In addition, while the quality of POIs may change on a daily basis, rankings or "Best Of" lists require significant human capital and are often generated far too infrequently to reflect the currently quality of the POIs.

Furthermore, although systems may determine a rank of a POI based on a population of users that vote for or against the POI, such systems are rarely effective at incentivizing an individual user to add his or her vote. Additionally, these systems are often inadequate in creating a viral feedback-loop among the voters' social group to join in and vote on corresponding POIs.

In view of the foregoing, there is a need for improved systems and methods for ranking POIs. In addition, there is a need for improved systems and methods that can automatically and reliably rank POIs, including local POIs. Still further, there is a need for improved techniques for ranking POIs based on input, including input from a user, viral input from a user's social network, and/or additional input based on searches for maps and travel directions for traversing a route. Such systems and methods may be implemented in computer-based environments, such as the Internet and network environments that provide, for example, online content or functions (e.g., mapping, search, etc) to users.

SUMMARY

Consistent with embodiments of the present disclosure, a computer-implemented method is provided that determines, using at least one processor, initial rankings for a plurality of points of interest associated with a geographic region. The method also includes generating an instruction to transmit information associated with the points of interest to a user device. The transmitted information may include the initial rankings. In response to the transmitted information, the method may obtain voting information associated with at least a subset of the points of interest. The voting information is provided by at least one of a user of the user device or a member of a social network associated with the user. The method also includes calculating, using the at least one processor, modified rankings for the points of interest based on at least the initial rankings and the voting information.

Consistent with further embodiments of the present disclosure, an apparatus is provided including a storage device and at least one processor coupled to the storage device. The storage device stores a set of instructions for controlling the at least one processor, and the at least one processor, being operative with the set of instructions, is configured to determine initial rankings for a plurality of points of interest associated with a geographic region. The processor is further configured to generate an instruction to transmit information associated with the points of interest to a user device. The transmitted information may include the initial rankings. In response to the transmitted information, the processor may be further configured to obtain voting information associated with at least a subset of the points of interest. The voting information is provided by at least one of a user of the user device or a member of a social network associated with the user. The processor is further configured to calculate modified rankings for the points of interest based on at least the initial rankings and the voting information.

Other embodiments of the present disclosure relate to a tangible, non-transitory computer-readable medium that stores a set of instructions that, when executed by a processor, perform a method that includes determining initial rankings for a plurality of points of interest associated with a geographic region and generating an instruction to transmit information associated with the points of interest to a user device. The transmitted information may include the initial rankings. In response to the transmitted information, the method includes obtaining voting information associated with at least a subset of the points of interest. The voting information is provided by at least one of a user of the user device or a member of a social network associated with the user. The method also includes calculating modified rankings for the points of interest based on at least the initial rankings and the voting information.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

BRIEF DESCRIPTION OF THE DRAWINGS

FIGS. 7A-7C are diagrams of exemplary data structures for determining an edginess of a geographic region, consistent with disclosed embodiments.

FIGS. 9A-9F are diagrams of exemplary data structures for determining a walkability of a geographic region, consistent with disclosed embodiments.

DESCRIPTION OF THE EMBODIMENTS

Reference will now be made in detail to embodiments of the invention, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
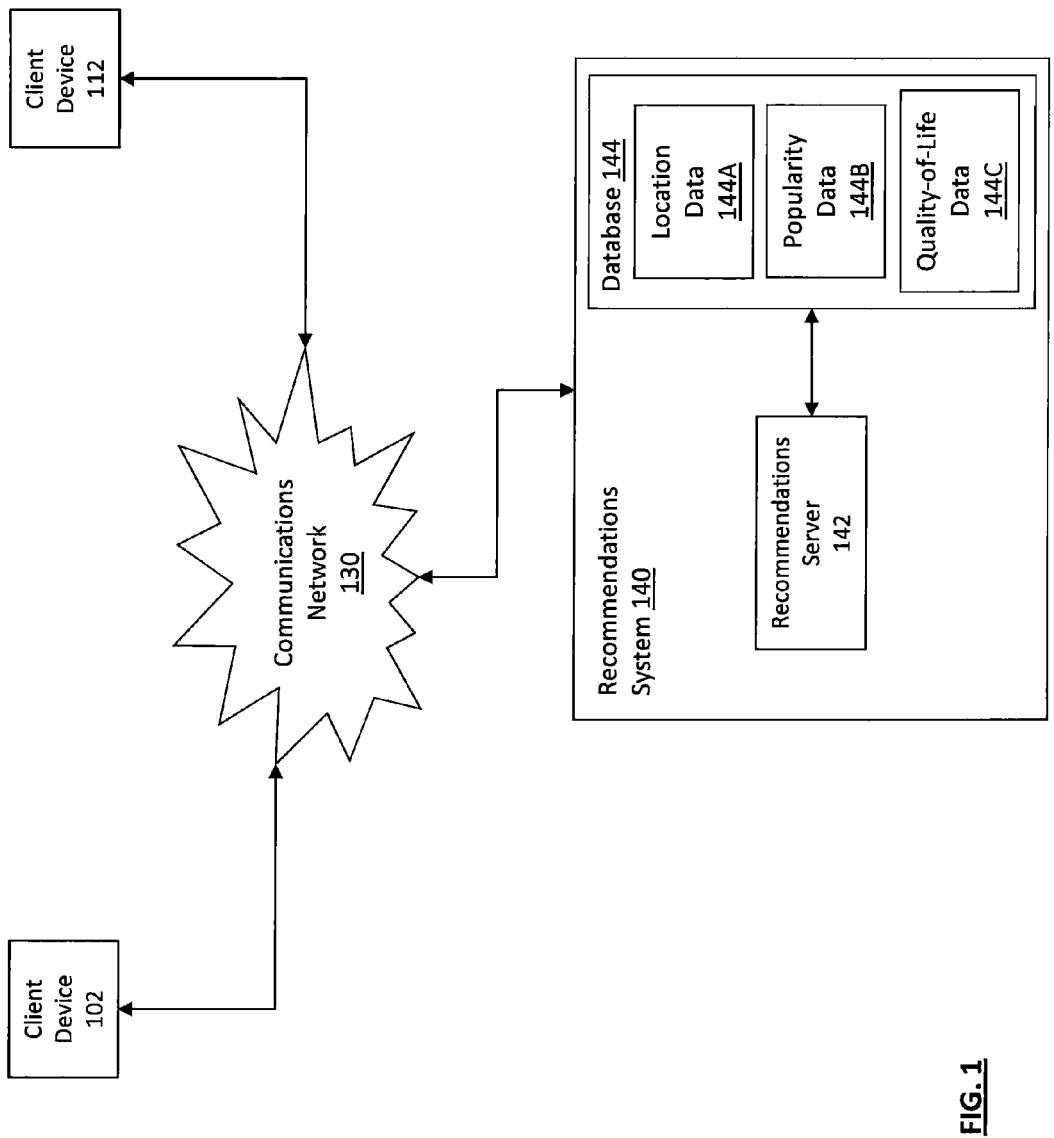
FIG. 1 is a diagram of an exemplary computing environment in which embodiments of the present disclosure may be practiced.

FIG. 1 illustrates an exemplary computing environment 100 in which embodiments of the present disclosure may be practiced. In FIG. 1, a recommendations system 140, a client device 102, and a client device 112 are interconnected via a communications network 130. In an embodiment, client devices 102 and 112 can include, but are not limited to, a personal computer, a laptop computer, a notebook computer, a hand-held computer, a personal digital assistant, a portable navigation device, a mobile phone, a smart phone, and any additional or alternate computing device apparent to a person of ordinary skill in the art. Although computing environment 100 includes multiple client devices in communication with recommendations system 140, persons of ordinary skill in the art will recognize that computer environment 100 may include any number of additional number of mobile or stationary client devices, any number of additional map systems (or servers), and any additional number of computers, systems, or servers without departing from the spirit or scope of the disclosed embodiments.

Communications network 130 may represent any form or medium of digital data communication. Examples of communication network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet. The Internet may include any publicly-accessible network or networks interconnected via one or more communication protocols, including, but not limited to, hypertext transfer protocol (HTTP) and transmission control protocol/internet protocol (TCP/IP). Moreover, communications network 130 may also include one or more mobile device networks, such as a GSM network or a PCS network, that allow mobile devices, such as client device 112, to send and receive data via applicable communications protocols, including those described above.

In the exemplary embodiment of FIG. 1, recommendations system 140 includes a recommendations server 142 and a recommendations database 144, which is disposed in communication within recommendations server 142. For example, recommendations server 142 and recommendations database 144 may be incorporated into a single hardware unit, for example, a single computer or a single server. In such an embodiment, recommendations database 144 may be incorporated into, or stored within, a storage medium or storage device of recommendations server 142, as described in FIG. 2. However, recommendations server 142 and recommendations database 144 are not limited to such configurations, and, in additional embodiments, recommendations database 144 may reside on any additional or alternate computer or server accessible to recommendations server 144 without departing from the spirit of scope of the present disclosure.

In accordance with an embodiment, recommendations server 142 may include a general purpose computer (e.g., a personal computer, network computer, server, or mainframe computer) having one or more processors that may be selectively activated or reconfigured by a computer program. In additional embodiments, recommendations server 142 be incorporated as a node in a distributed network, and additionally or alternatively, as a networked server in a cloud-computing environment. Recommendations server 142 may communicate via network 130 with one or more additional servers (not shown), which may enable recommendations server 142 to distribute processes for parallel execution by the other servers.

Recommendations database 144 includes location data 144A, popularity data 144B, and quality-of-life data 144G. In an embodiment, location data 144A may include information identifying one or more geographic regions that, for example, are associated with businesses, restaurants, entertainment, landmarks and/or other points of interest (POIs) to a potential user. For example, the information associated with a particular geographic region may include, but is not limited to, a name associated with the geographic region or a geospatial identifier associated with the geographic region (e.g., a "Where On Earth ID" (WOEID) assigned to the region by the Yahoo Developer Network). Further, in additional embodiments, the information identifying the particular geographic region may also include a set of geographic coordinates (e.g., longitudes and latitudes) associated with a centroid of the geographic region, and additionally or alternatively, with boundaries of the particular geographic region.

In an embodiment, the one or more geographic regions may include a hierarchy of linked geographic units. For example, the geographic units may include, but are not limited to, a country, a state or province of the country, a county within the state or province, an urban area located with the state or province, a neighborhood or other subset of the urban area. However, the disclosed embodiments are not limited to such exemplary geographic units, and in additional embodiments, location data 144A may include information identifying one or more "hotspots" within a neighborhood of a dense urban area. In such embodiments, a data record associated with a geographic unit may include information identifying links between that geographic unit and other geographic units within the hierarchical structure, as well as information identifying the position of the geographic units within the hierarchical structure.

In an embodiment, a "hotspot" may represent a location, an area, or other portion of a neighborhood that includes a cluster of bars, restaurants, entertainment venues, landmarks, stores or other points of interest popular with any combination of neighborhood residents and visitors. For example, an urban area such as "Washington, D.C." may include individual neighborhood, such as "Georgetown," which may be subdivided into a number of individual hotspots, such as "$37^{th}$ West and Prospect Street" and "$31^{st}$ West and Corcoran Alley West."

In such embodiments, a hotspot may be defined to include a cluster of points of interest associated with geographic locations that falls within a threshold distance of a centroid of the hotspot. For example, such a threshold distance may include an arbitrarily-defined distance, e.g., 100 meters, a distance defined by an age of capability of a resident or visitor (e.g., a distance an average resident could safely walk), or in accordance with any additional or alternate criterion appropriate to the points of interest and the hotspot.

Referring back to FIG. 1, popularity data 144B of recommendations database 144 may include data records indicative of popularities of points of interest within the individual geographic units represented by location data 144A. As described, exemplary points of interest may include, but are not limited to, shops, restaurants, bars, museums, entertainment venues, concert halls, coffee shops, monuments, or other landmarks disposed within a geographic region.

In such an embodiment, a data record associated with a point of interest in popularity data 144B may include statistical measure of a popularity of that point of interest. For example, a number of individuals may have visited the point of interest and provided a numerical rating indicative of their experience at the point of interest. In such an embodiment, the statistical measure may represent an average of the provided ratings, a weighted average of the provided ratings (e.g., based on age group), and any additional or alternate statistical measure indicative of the popularity of the point of interest.

Further, in an embodiment, popularity data 144B may also include additional information indicative of an individual's experience at the point of interest. For example, and in addition to a numerical rating, a user may also provide textual comments describing his or her experience at the point of interest. In such an embodiment, the textual comments may be stored within population data 144B with a corresponding identifier of the user.

Popularity data 144B may include information entered by an individual visitor to a point of interest, or alternatively, information derivative of that entered by the individual user. However, popularity data 144B is not limited to such exemplary information, and in additional embodiments, the data records of popularity data 144B may be based on information obtained from one or more web sites accessed by an individual, e.g., through user devices 102 and 112. For example, an individual may access a web site to obtain geographic information or travel directions associated with a point of interest. In such embodiments, information associated with the requested map and travel directions may be transmitted from a web server associated with the web site across network 130 to recommendations system 140, which may use such information to update corresponding data records within popularity data 144B.

Referring back to FIG. 1, quality-of-life data 144C may include data records associated with one or more characteristics associated with a quality-of-life within corresponding geographic units, e.g., a neighborhood or a hotspot. In an embodiment, such quality-of-life data may include, but is not limited to, a measure of a "social edginess" of a neighborhood or hotspot, a measure of a "wakability" of a neighborhood or hotspot, an indicia of whether neighborhood or hotspot has a residential, an urban, or a suburban character, or any additional or alternate characteristic of the quality of life of the neighborhood or hotspot.

For example, the social edginess of a neighborhood or hotspot may be represented by a numerical ranking indicative of a likelihood with which an individual would encounter the colorful aspects of urban life (e.g., criminal activity, counter-cultural phenomena, or underground activities). Further, for example, the walkability of a neighborhood or hotspot may be represented by a numerical ranking indicative of whether the neighborhood or hotspot may be easily traversed by foot (e.g., whether the neighborhood has defined sidewalks and crosswalks). In such embodiments, an increase in a numerical rating may indicate an increase in the walkability of the neighborhood or hotspot, or alternatively, an increase in the edginess of the neighborhood or hotspot.

Figure 2:
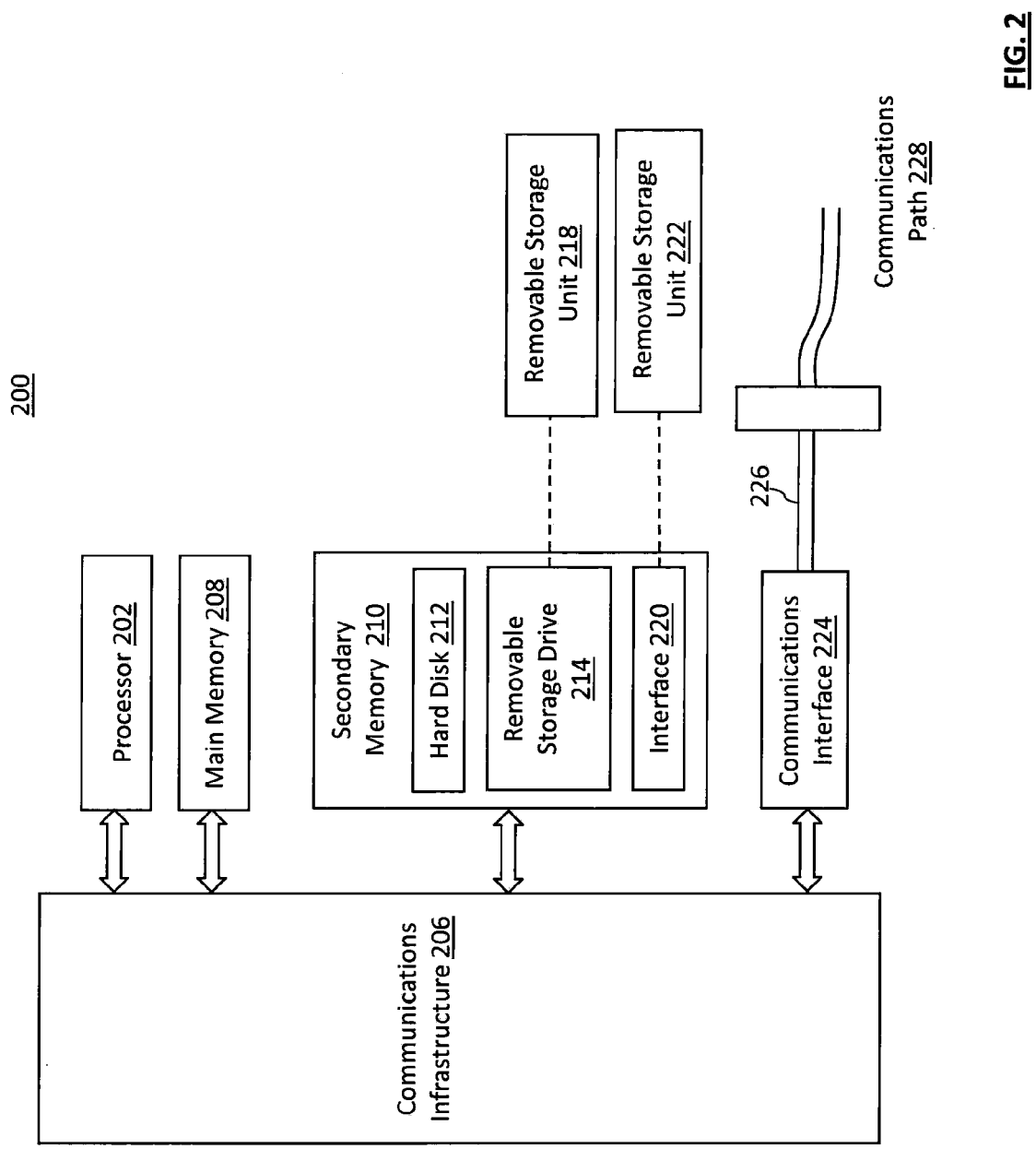
FIG. 2 is a diagram of an exemplary computer system, consistent with disclosed embodiments.

In the exemplary embodiment of FIG. 1, client devices 102 and 112, and recommendations server 142, may represent any type of computer system capable of performing communication protocol processing. FIG. 2 is an exemplary computer system 200, according to an embodiment of the present disclosure. Computer system 200 includes one or more processors, such as processor 202. Processor 202 is connected to a communication infrastructure 206, such as a bus or network, e.g., network 130 of FIG. 1.

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other computer-readable storage medium that is read by and written to by removable storage drive 214. As will be appreciated, the removable storage unit 218 can represent a computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, a wireless transmitter or card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire or cable, fiber optics, an RF link, wireless transmissions, and other communications channels. In an embodiment, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer readable media. Additionally or alternatively, computer programs and sets of instructions may also be received via communications interface 224 and stored on the one or more computer readable media.

Such computer programs and instructions, when executed by processor 202, enable processor 202 to perform one or more of the computer-implemented methods described herein. Examples of program instructions include, for example, machine code, such as that code produced by a compiler, and files containing a high-level code that can be executed by processor 202 using an interpreter.

The computer-implemented methods described herein can also be implemented on a single processor of a computer system, such as processor 202 of system 200. In another embodiment, computer-implemented methods consistent with the present disclosure may be implemented using one or more processors within a single computer system, and additionally or alternatively, these computer-implemented methods may be implemented on one or more processors within separate computer systems linked via a network.

In an embodiment, the computer-implemented methods described herein may enable a user of a user device, e.g., user devices 102 and 112 of FIG. 1, to obtain and subsequently interact with a set of rankings associated with points of interest within a geographic region specified by the user. For example, in response to a request from the user, recommendations server 142 of recommendations system 140 may generate information identifying one or more points of interest (POIs) within a neighborhood or geographic hotspot, which may be transmitted to user device 102 across network 130 using any of the communications protocols outlined above.

Upon receipt of the information, user device 102 may present the POIs to the user within a web page or similar graphical user interface, and may subsequently enable the user to vote for or against the presented POIs. In such an embodiment, the number of votes cast for a particular POI may affect a ranking of that POI within a set of competitors, e.g., a list of "best" restaurants within the neighborhood or hotspot. Further, in such embodiments, recommendations server 142, in conjunction with user device 102, may provide an indication of a number of votes needed to change a ranking associated with a particular POI to the user as a motivational goal to not only induce the user to vote on the POI, but further to induce the user to engage with friends within one or more social networks to vote in support or against the POI.

Figure 3:
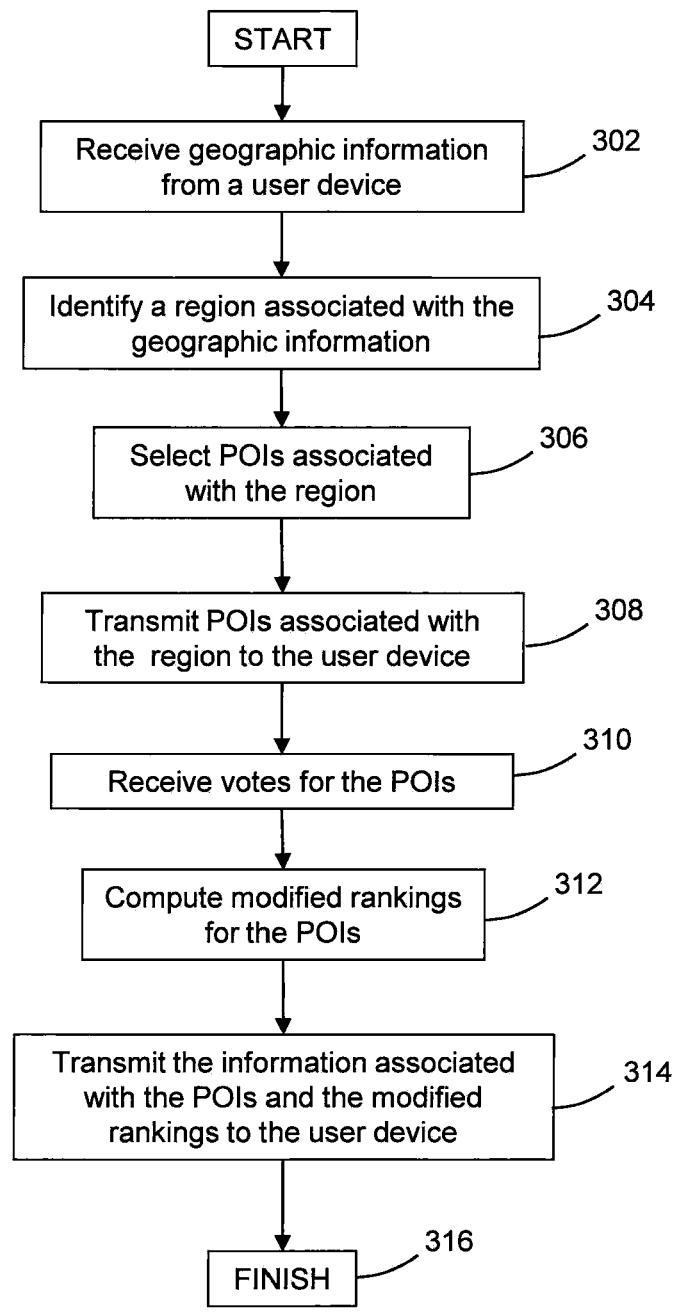
FIG. 3 is a flowchart of an exemplary method for ranking points of interest, consistent with disclosed embodiments.

FIG. 3 illustrates an exemplary method 300 for providing ranked points of interest (POIs) to a user, in accordance with a disclosed embodiment. Method 300 may provide functionality that enables a recommendations server (e.g., recommendations server 142) to provide information identifying a set of POIs to a user device (e.g., user device 102), and to generate updated rankings for a set of displayed POIs based on votes received from a user of a user device (e.g., user device 102), and additionally or alternatively, from one or members of a social network that includes the user.

In step 302, recommendations server 142 may receive geographic information from user device 102. As part of step 302, recommendations server 142 may receive a request for POIs associated with a particular neighborhood or hotspot of a geographic region from a user at user device 102. In an embodiment, the request may be entered into a web page or other graphical user interface associated with recommendations server 142, as described below in reference to FIGS. 4A-4E, and user device 102 may transmit information associated with the request to recommendations server 142 over communications network 130.

Figure 4A:
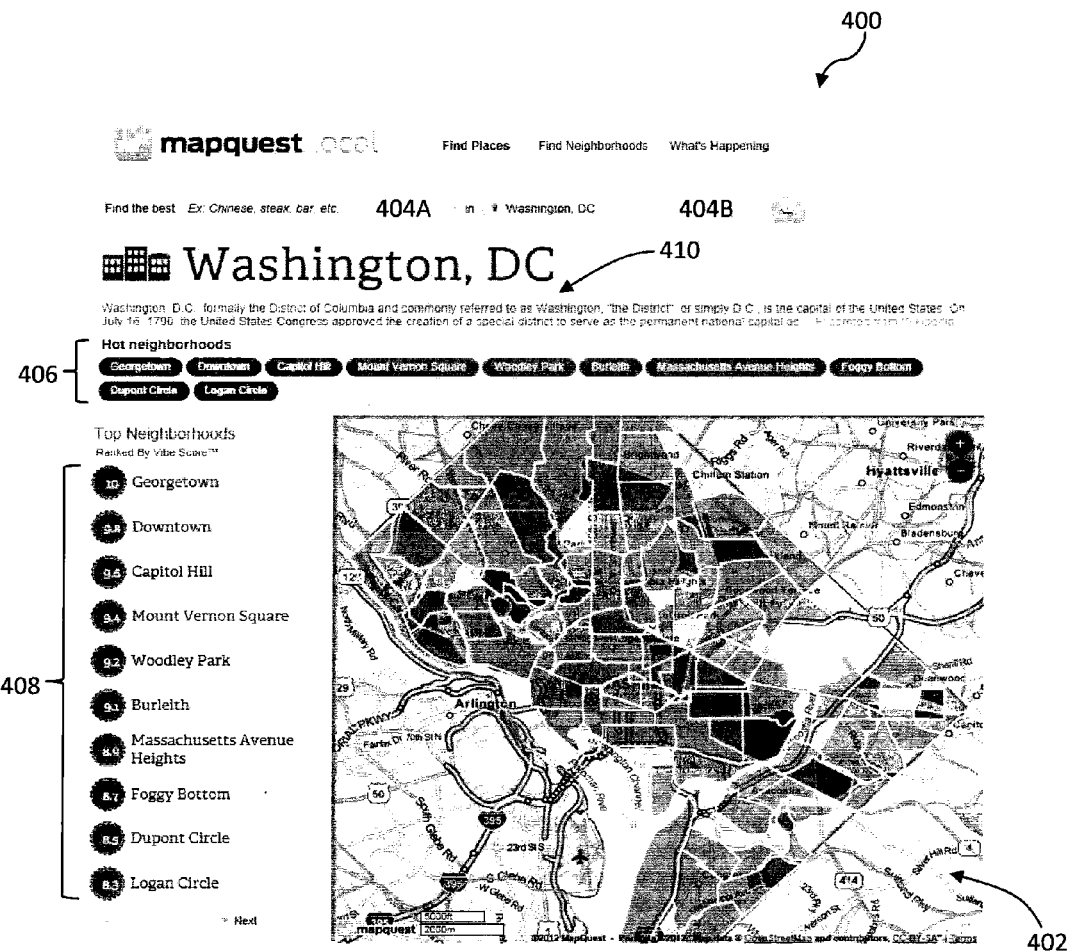
FIGS. 4A-4E illustrate exemplary web pages that may be provided to a user by a recommendations system, consistent with disclosed embodiments.

For example, as depicted in FIG. 4A, the user of user device 102 may execute a web browser and may access a web page 400 associated with recommendations server 142. For example, web page 400 may programmatically identify a geographic region associated with an Internet Protocol (IP) address of the requesting user, and may present a version of web page 400 that is consistent with the geographical region. In such an embodiment, the user may be currently located within Washington, D.C., and recommendations server 142 may present a version of web page 400 to the user that is associated with Washington, D.C., and that, for example, includes a map 402 of the Washington, D.C., area, and information 410 that provides historical background on Washington, D.C.

The disclosed embodiments are not limited to such techniques for determining a geographic region associated with user device 102. For example, user device 102 may include a global position system (GPS) unit, and user device 102 may transmit geographic information provided by the GPS unit to recommendations server 142 as a portion of the request for the web page. Additionally or alternatively, the geographic region associated with user device 102 may be provided by the user when requesting the web page, may be specified by the user upon registration with or login to recommendations server 142, or may be determined by recommendations server 142 using any additional or alternate mechanism apparent to one of skill in the art, without departing from the spirit or scope of the disclosed embodiments.

In FIG. 4A, web page 400 includes a region 404A, into which a user may enter a query requesting information on a "best" restaurant, bar, attraction, or other type of POI within Washington, D.C. For example, and in response to the user query, the "best" restaurant bar, attraction, or other type of POI within Washington, D.C., may be identified by recommendation server 142 based on corresponding popularity data, e.g., as stored within popularity data 144B of database 144.

Web page 400 also includes a region 404B, into which a user may enter a query requesting information identifying a neighborhood of interest within Washington D.C. Web site 400 may also provide selectable icons in region 406 that enable the user to obtain information associated with "hot" neighborhoods in Washington, D.C., and additionally or alternatively, web page 400 may provide a ranked list 408 of the "top" neighborhoods in Washington, D.C. In such embodiments, the determination of "top" and "hot" neighborhoods may be based on, for example, popularity data 144B of database 144.

Figure 4B:
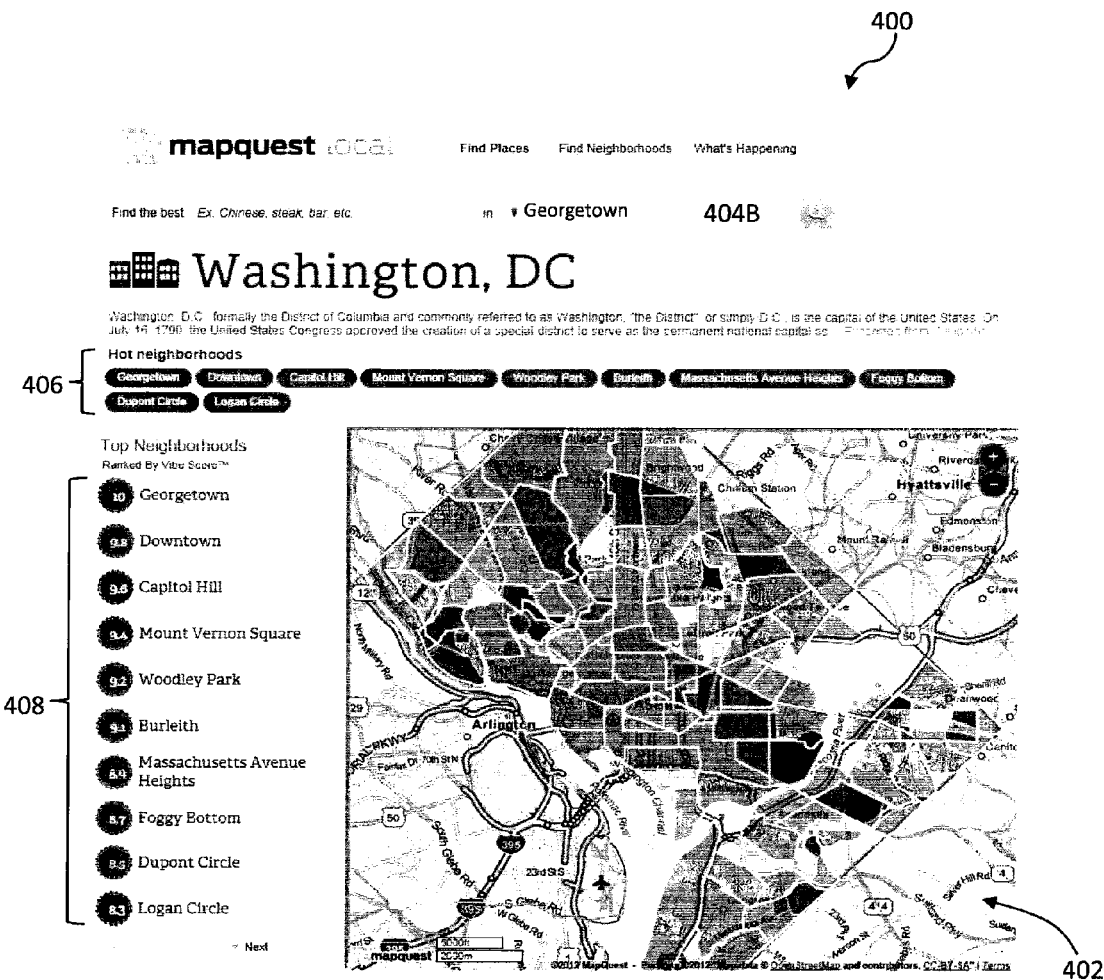

As described in FIG. 4B, the user may enter "Georgetown" in region 404B, may select the "Georgetown" icon within region 406, or alternatively, may select "Georgetown" within ranked list 408. Upon entry of the geographic information in region 404, or upon the selection of the neighborhood in region 406 or ranked list 408, user device 102 may transmit the corresponding geographic information across network 130 to recommendations server 142, which may be received in step 302 of method 300.

Referring back to FIG. 3, recommendations server 142 may process the received geographic information to identify, in step 304, a region associated with the received geographic information, which includes, but is not limited to, a neighborhood or a hotspot of the neighborhood. Upon identification of the region in step 304, recommendations server 142 may select one or more points of interest (POIs) associated with the identified region in step 306. For example, recommendations server 142 may leverage data records included within popularity data 144B to identify and select the one or more POIs in step 306.

In step 308, information associated with the selected POIs may be transmitted from recommendations server 142 to user device 102, which may render and display the information within a corresponding web page. In such embodiments, recommendations server 142 may transmit the information associated with the selected POIs to user device 102 across network 130 using any of the communications protocols outlined above.

In an embodiment, the information transmitted to user device 102 in step 308 may include an identifier of each selected POI, additional metadata describing each selected POI (e.g., a textual description of the POI, a description of a cost associated with the POI, or a description of a service provided by the POI), one or more images associated with each selected POI, and additionally or alternatively, a preliminary ranking associated with each selected POI. For example, recommendations server 142 may generate the preliminary ranking for the selected POIs based on data records included within popularity data 144B, which may be adjusted to reflect a measure of an edginess and a walkability of the hotspot, as included within quality-of-life data 144O. Upon receipt of the information associated with the selected POIs, user device 102 may display at least a portion of the received POI information within a corresponding web page, as described below with reference to FIG. 4C.

Figure 4C:
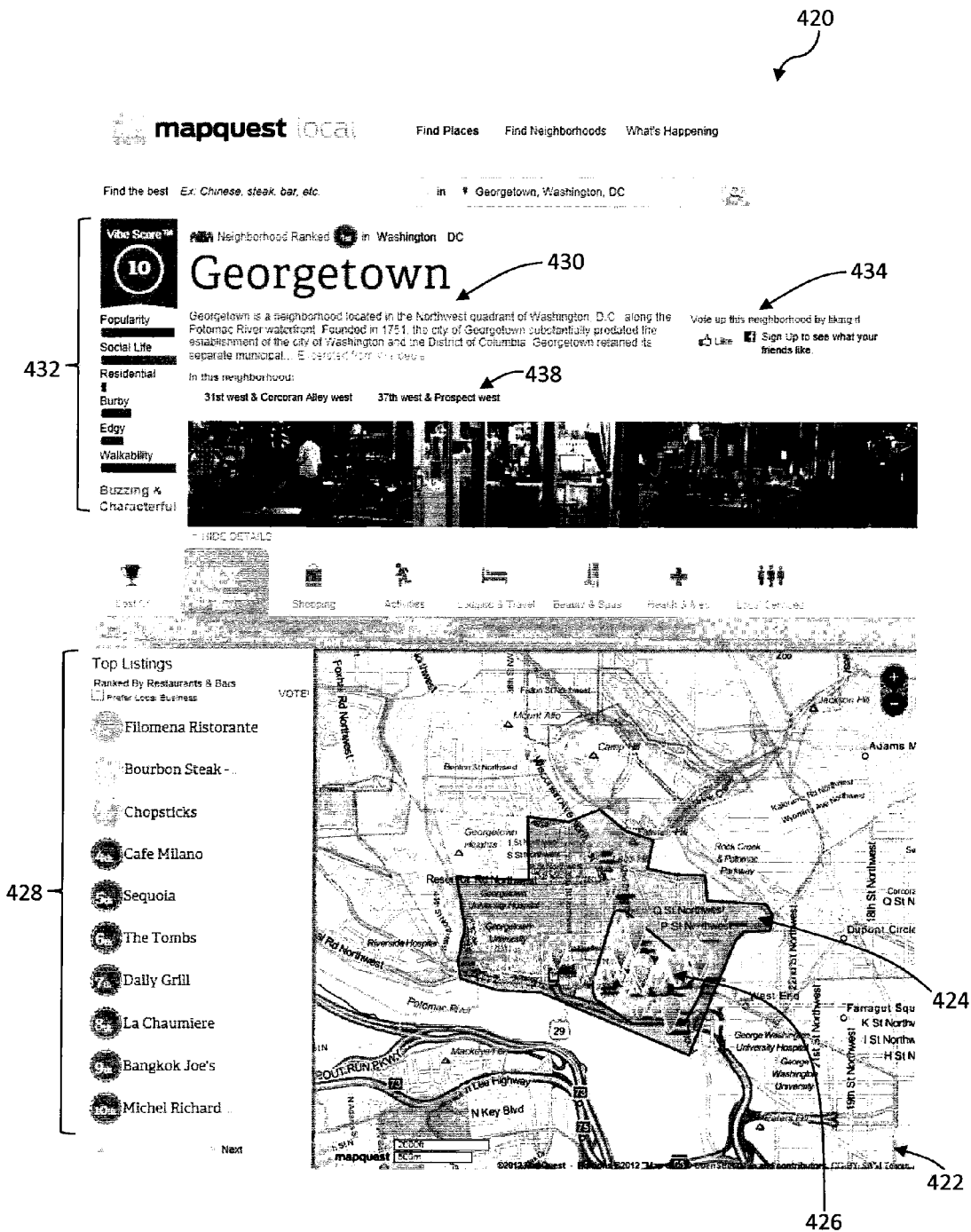

As shown in FIG. 4C, a web page 420 may present at least a portion of the POIs within list 428, and the POIs within list 428 may represent "top" POIs ordered in accordance with their preliminary ranking. In addition, in the exemplary embodiment of FIG. 4C, the Georgetown neighborhood may be highlighted within a portion 424 of map 422, and identifiers 426 associated with corresponding ones of the POIs in list 428 may be displayed to the user within map 422. In an embodiment, the user may click or otherwise select one of identifiers 426 to obtain additional information associated with the corresponding point of interest.

In FIG. 4O, web page 420 may also provide text and images describing the Georgetown neighborhood within region 430, and may provide information on a quality of life associated with the Georgetown neighborhood in region 432. For example, the quality-of-life information may provide an overall "Vibe Score" for the Georgetown neighborhood, which may be derived from popularity data 144B, quality-of-life data 144C, votes received from residents and visitors of the Georgetown neighborhood, and/or information posted to social networks that include the residents and visitors of the Georgetown neighborhood.

Further, the quality-of-life information within region 432 may include, but is not limited to, information describing a walkability, a "burbiness," and an edginess or of the Georgetown neighborhood, as derived, for example, from quality-of-life data 144C. Region 432 may also include information identifying a popularity of the Georgetown neighborhood, an indication of a quality of social life within the Georgetown neighborhood, and an indication of a quality of residential life within the Georgetown neighborhood, as derived, for example, from popularity data 144B and/or quality-of-life data 144C. The disclosed embodiments are, however, not limited to such exemplary quality-of-life information, and in additional embodiments, region 432 may include describe any additional or alternate quality-of-life metrics appropriate and of interest to the residents and visitors to the Georgetown neighborhood.

Further, although not depicted in FIG. 4C, web page 400 may provide a region that includes comments from other individuals within a "Neighborhood Wall." In such embodiments, the information posted within the Neighborhood Wall may include, but is not limited to, information posted to a social network of a resident or visitor of the Georgetown neighborhood.

Figure 4D:
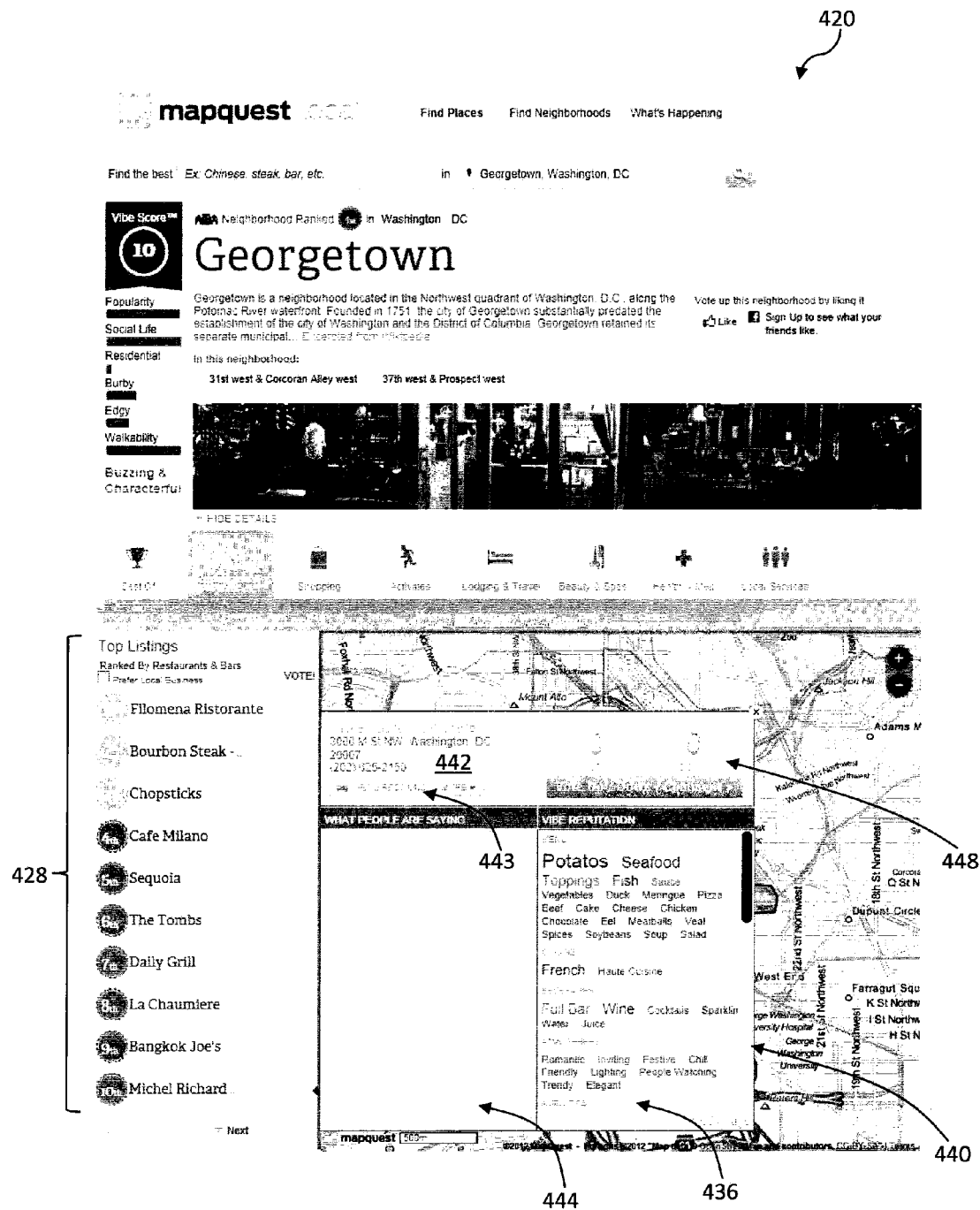

In additional embodiments, web page 420 may provide the user with an opportunity to obtain additional information regarding one or more of the POIs within list 428, as described within window 440 of FIG. 4D. For example, in FIG. 4D, the user may have selected a particular POI, e.g., "Michelle Richard Citronelle," and in response to the selection, window 440 may be generated and displayed within web page 420. In such embodiments, window 440 may identifying an address and contact information associated with Michelle Richard Citronelle within region 442, and may include a region 443 that enables the user to obtain travel directions to Michelle Richard Citronelle, e.g., the an API call or other programmatic interface to a serve that provides travel directions.

Window 430 also includes region 444, which displays comments on Michelle Richard Citronelle provided by the user of user device 102 or by visitors and residents of the Georgetown neighborhood, and region 446, which displays information associated with a "Vibe Reputation" of Michelle Richard Citronelle. For example, the "Vibe Reputation" within region 446 may provide information identifying a menu, type of cuisine, beverages, atmosphere, and/or amenities provided by Michelle Richard Citronelle.

Further, in window 440, region 448 may provide the user with an opportunity to vote for Michelle Richard Citronelle (i.e., by voting "up"), to vote against Michelle Richard Citronelle (i.e., by voting "down"), and/or to provide comments on Michelle Richard Citronelle, which may be displayed within region 444. In such an embodiment, the user's vote for or against Citronelle may be recorded by user device 102, and subsequently transmitted to recommendations server 142 over network 130, and a cumulative tally of the votes may be displayed within region 448. For example, recommendation server 142 may modify a ranking associated with Michelle Richard Citronelle (e.g., within list 428 of FIG. 4C) based on the user's vote.

Further, although not depicted in FIG. 4D, voting for a particular POI may be framed as an act that may change the rank of the particular POI within list 428, if sufficient votes are cast. In such an embodiment, and for a particular POI, web page 420 may provide a qualitative indication of a number of votes necessary to change the ranking of the POI, including but not limited to a textual message indicating that the user is only "a few votes away from," "tantalizingly close to," or "within reach of" changing the rank of the POI. However, web page 420 is not limited to such qualitative indications, and in additional embodiments, web page 420 may include any additional or alternate qualitative or quantitative indication to provide an incentive for the user to vote on a particular POI.

Referring back to FIG. 4C, web page 420 may also provide a link 434 to one or more social network accounts of the user (e.g., Facebook, LinkedIn, MySpace, or Google+). By providing such a link, link 434 enables the user to endorse the particular POI to one or more friends within the social network, and to select these friends to potentially join the user in voting for the POI. In an embodiment, link 434 may enable a user to transit a notification to the one or more friends encouraging these friends to vote for the POI. For example, the notification may include a personal message directed to one or more of the friends and transmitted within the social network, or alternatively, using any other communications technique (e.g, email and text message) appropriate to the one or more friends. In an additional embodiment, the notification to the one or more friends may be pushed to a news and/or content feed accessible to the user and/or the one or more friends.

Additionally, although not depicted in FIG. 4C, web page 420 may also display information identifying the one or more social networking friends. For example, the displayed information may include an ordered list of social networking friends organized in accordance with a number of times these users have voted, or in accordance with a residence of the social networking friends, as a social networking friend is more likely to vote on the particular POI if he or she resides within or proximate to the Georgetown neighborhood. Additionally or alternatively, the displayed information may indicate one or more specific POIs on which the social networking friends have voted, and additionally or alternatively, what votes were cast for the POIs by the social networking friends.

Figure 4E:

Further, in FIG. 4C, one or more hotspots within the Georgetown neighborhood may be identified by web page 420 in region 438. In such an embodiment, the hotspots within region 438 may be identified by recommendations server 142 using information within location data 144A and popularity data 144B, as described above. Further, in such embodiments, the user may select one or more of the local hotspots, e.g., "37$^{th}$ West and Prospect Street," or alternatively, select a corresponding one of identifiers 426, and an additional web page 460 may be displayed to the user, as depicted in FIG. 4E. In such an embodiment, web page 460 of FIG. 4E may present information for the "37$^{th}$ West and Prospect Street" hotspot that is similar to that presented for the Georgetown neighborhood in web page 420.

Referring back to FIG. 3, recommendations server 142 may receive votes associated with the transmitted POIs in step 310. In an embodiment, the received votes may correspond to votes entered by a user of user device 102, as described above in reference to FIG. 4D, and additionally or alternatively, the votes may correspond to social networking friends of the user that were encouraged to vote for or against the POIs by the user.

Based on the received votes, recommendations server 142 may compute modified rankings for the POIs in step 312. For example, based on the received votes, the modified ranking may increase a rank of a particular POI, or alternatively, decrease the rank of a particular POI. In such an embodiment, by incentivizing a user to engage a social network to vote for or against the POI, recommendations server 142 may expand the number of users who vote for or against the particular POI, thereby generating more accurate ranking data for POIs within the neighborhood or hotspot.

In step 314, information associated with the modified ranking of the POIs associated with the region or hotspot may be transmitted from recommendations server 142 to user device 102 across network 130. For example, recommendations server 142 may transmit the information associated with the modified POI rankings to user device 102 using any of the communications protocols outlined above. User device 102 may then process the received information and may present the POIs associated with the neighborhood or hotspot in accordance with the modified rankings, e.g., within list 428 of web page 420. Exemplary method 300 is subsequently completed in step 316.

In an embodiment, recommendations server 142 may record information associated with each user that supplied a vote for a particular POI or set of POIs. For example, such information may include, but is not limited to, an alphanumeric identifier of each user, an email address or telephone number associated with each user, and/or an IP address associated with each user.

In such embodiments, recommendations server 142 may also transmit a notification, to each user that voted on the particular POI or set of POIs, that the modified rankings increase or decrease an initial ranking of the particular POI or set of POIs. The notification may be transmitted in accordance with the recorded information associated with the users, and may prompt the users to review the revised ranking for the POIs associated with the neighborhood or hotspot and respond by providing additional votes for or against the POIs.

In the embodiments described above with reference to FIGS. 3 and 4A-4E, recommendation server 142 acts in conjunction with user device 102 to motivate a user to interact with rankings of POIs within a neighborhood, as well as to encourage the user to identify one or more friends within a social network to similarly interact with the POIs within that neighborhood. However, for a dense urban area, a neighborhood may include many dozens of points of interest, and may represent too large a geographic context for POI rankings described above. In such embodiments, a finer measure of geographic content within the neighborhood, i.e., a "hotspot," may be more appropriate for the exemplary POI ranking techniques, as described below in reference to FIG. 5.

Figure 5:
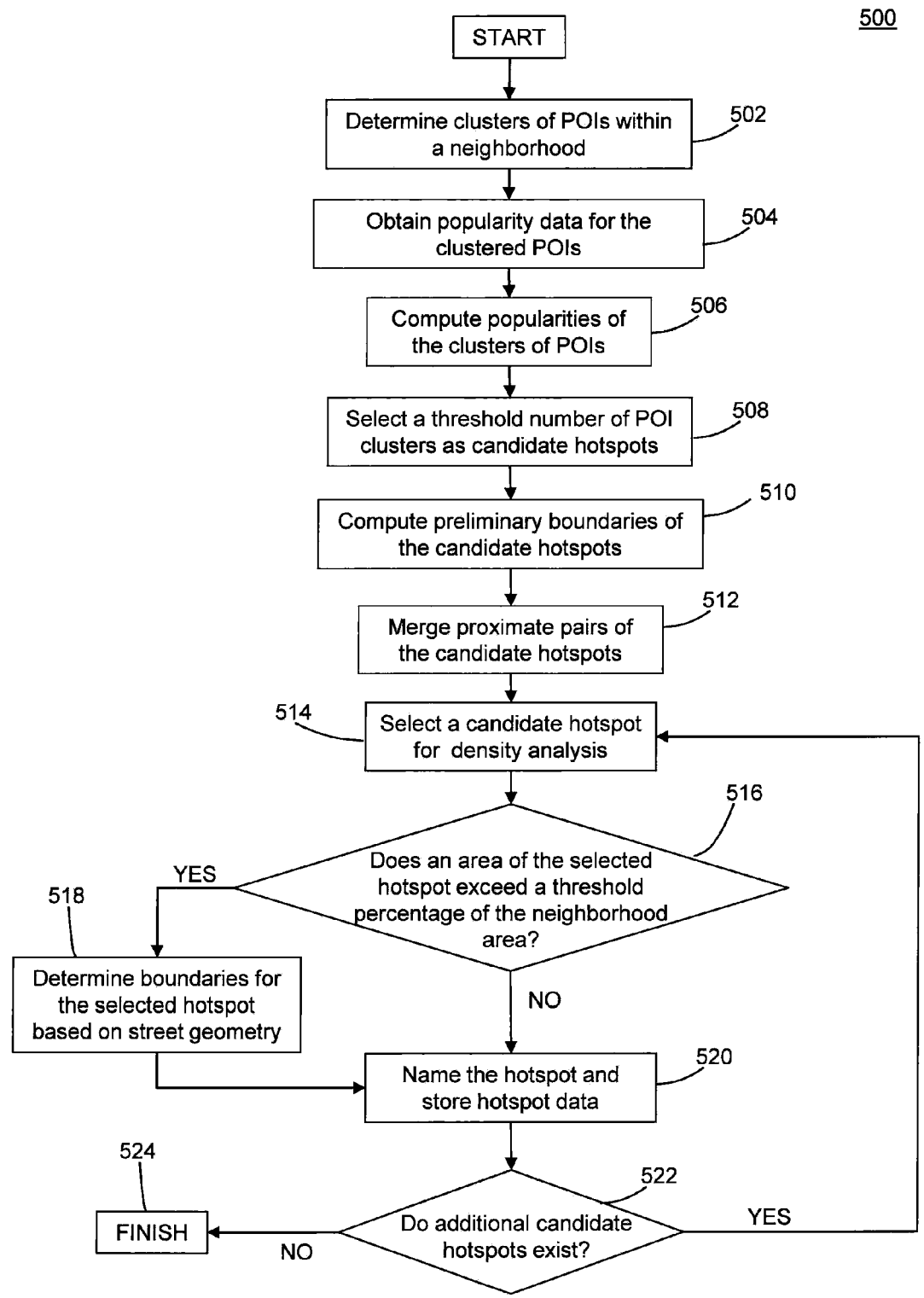
FIG. 5 is a flowchart of an exemplary method for determining geographic boundaries of subsets of neighborhoods, consistent with disclosed embodiments.

FIG. 5 is a flowchart of an exemplary method 500 for determining a geographic boundary of a subset of a neighborhood, according to a disclosed embodiment. Method 500 may provide functionality that enables a recommendation server (e.g., recommendations server 142 of FIG. 1) to determine a set of boundaries for a hotspot within a geographic region, e.g., one of hotspots 434 of the Georgetown neighborhood in FIG. 4C.

In step 502, recommendations server 142 may determine clusters of points of interest (POIs) that correlate with potential user destinations within a particular geographic region, which may include, but it not limited to, a neighborhood. In an embodiment, the POI clusters may include, but are not limited to, restaurants, bars, stores, and landmarks that falls within a threshold geographic distance of each other in the neighborhood. For example, such a threshold distance may be defined by a mode of transportation, e.g., walking or driving, and may include, but are not limited to 100 meters, 1000 meters, or any additional or alternate distance apparent to one of skill in the art and appropriate to the neighborhood.

In step 504, recommendations server 142 may obtain popularity data associated with the clustered POIs. For example, such popularity data may be obtained from popularity data store 144B and may be based on, for example, logs of web sites that provide geographic information to users, such as those websites that provide maps and driving directions in response to user queries.

Recommendations server 142 may leverage the obtained popularity data to compute popularity values corresponding to the clustered POIs in step 506. For example, the popularity values computed for each cluster of POIs in step 506 may represent an average of the popularities of the individual POIs within each cluster, a median of the popularities of the individual POIs within each cluster, a weighted average of the popularities of the individual POIs within each cluster, or any additional or alternate metric representative of the popularities of the individual POIs within each cluster. Further, the popularity values computed by recommendations server 142 in step 506 may be indicative of popularities of the corresponding POI clusters as destinations for visitors to the neighborhood, and additionally or alternatively, for residents within the neighborhood.

In step 508, recommendations server 142 may select a predetermined number of the POI clusters (e.g., six or more) as potential hotspots. For example, the predetermined number of clustered POIs may correspond to those clustered POIs having the highest computed popularity values, and as such, the candidate hotpots may be associated with corresponding ones of the clustered POIs that are most popular among visitors to the neighborhood, and additionally or alternatively, with residents of the neighborhood.

The disclosed embodiments are, however, not limited to such exemplary selection criteria. In additional embodiments, recommendations server 142 may select POI clusters in step 508 based on social networking data (e.g., a number of "Likes" associated with the clustered POIs or a number of "friends" within corresponding social networking websites), numbers of online reviews (e.g., posted through Yelp), combinations thereof, an any additional or alternate metric apparent to one of skill in the art and appropriate to the clustered POIs and neighborhood.

Recommendations server 142 may then compute preliminary polygonal boundaries for each of the candidate hotspots in step 510. For example, recommendations server 142 may explore the neighborhood surrounding each of the candidate hotspots using a flood-fill algorithm, which may establish the preliminary boundaries for the candidate hotspots based on a threshold percentage of a density of each of the candidate hotspots.

For example, a density of a candidate hotspot may be defined based on a number of clustered POIs associated with the candidate hotspot, or alternatively, the density may be defined a quotient of the number of clustered POIs and an geographic area of the candidate hotspot. In such embodiments, the flood-fill algorithm may associate geographic units of the neighborhood with the candidate hotspot when corresponding densities of these geographic units exceed a threshold percentage of that density.

Further, the threshold percentage for one or more of the candidate hotspots may represent a fixed value defined by recommendations server 142 prior to initiating the flood-fill algorithm in step 510. For example, recommendations server 142 may define a fixed threshold percentage for a corresponding candidate hotspot at 33% of a density of the corresponding candidate hotspot, 85% of the density of the corresponding candidate hotspot, or any other threshold percentage appropriate to the candidate hotspot and the neighborhood.

The disclosed embodiments are not limited to such exemplary threshold percentages, and in additional embodiments, recommendation server 142 may define an initial threshold percentage prior to initiating the flood-fill algorithm (e.g., a threshold percentage of a density or a number of POIs), which may be adaptively modified by recommendations server 142 during execution of the flood-fill algorithm. For example, recommendation server 142 may increase, or alternatively, decrease, a magnitude of the threshold percentage when the flood-filled algorithm associates the candidate hotspot with geographic blocks that fall outside of the neighborhood of interest, when a surface area represented by the associated blocks exceeds a predetermined portion of the neighborhood (e.g., 80%), or in response to any additional or alternate indication that is appropriate to the flood-fill algorithm.

Upon completion of the flood-fill algorithm, commendation server 142 may obtain coordinate data for the geographical units associated with each of the candidate hotspots (e.g., from location data 144A of FIG. 1), and may compute preliminary polygonal boundaries for each of the candidate hotspots in step 510 based on the obtained coordinate data. Further, although described in terms of a flood-fill algorithm, recommendations server 142 may associate geographic units with the candidate hotspots and compute preliminary polygonal boundaries for the candidate hotspots in step 5610 using any additional or alternate technique apparent to one of skill in the art and appropriate to the candidate hotspots.

Referring back to FIG. 5, recommendations server 142 may merge proximate pairs of candidate hotspots in step 512. In an embodiment, recommendations server 142 may first identify, in step 512, one or more proximate pairs of candidate hotspots based on dispositions of the corresponding preliminary polygonal boundaries, or alternatively, an overlap of the corresponding preliminary polygonal boundaries. For example, recommendations server 142 may determine that a pair of candidate hotspots are proximate when corresponding portions of their preliminary polygonal boundaries that are disposed within a threshold separation distance of each other (e.g., thirty meters). Additionally or alternatively, recommendations server 142 may also determine that a pair of candidate hotspots are proximate when the regions enclosed by the corresponding polygonal boundaries overlap by greater than a threshold percentage (e.g., forty percent).

In such embodiments, and upon identification of a proximate pair of candidate hotspots, recommendation server 142 may then determine in step 512 whether a major transportation element forms at least a portion of an intersection between the preliminary polygonal boundaries of the proximate pairs. For example, such a major transportation element may include, but is not limited to a rail line, a subway line, a U.S. interstate highway, a state road, and any additional or alternate transportation element that would be deemed "major" to residents or visitors to the neighborhood.

If recommendation server 142 determines that the pair of candidate hotspots are proximate, and further, that a major transportation feature forms no part of an intersection between the preliminary polygonal boundaries of the proximate pair of candidate hotspots, then recommendations server 142 may merge the preliminary polygonal boundaries of the proximate pair of candidate hotspots in step 512. In such embodiments, the merged polygonal boundaries include the geographic regions bounded by the corresponding preliminary polygonal boundaries and maintain the clustered POIs associated with the each of the candidate hotspots.

If, however, recommendations server determines in step 512 that a major transportation element forms at least a part of an indication between the preliminary polygonal boundaries of the proximate pair of candidate hotspots, recommendations server 142 may determine not to merge the preliminary polygonal boundaries of the proximate pair. In such embodiments, recommendations server 142 may process the candidate hotspots in step 512, including those associated with merged polygonal boundaries, to identify additional proximate pairs of candidate hotspots for potential merger, as outlined above.

Referring back to FIG. 5, in step 514, recommendations server 142 then selects one of the candidate hotspots for density analysis, and recommendations server 142 determines in step 516 whether the selected hotspot exceeds a threshold coverage percentage of an area of the neighborhood. In an embodiment, the threshold coverage percentage may be established as 60% of the neighborhood area, although recommendation server 142 may establish any additional or alternate threshold coverage percentage appropriate to the neighborhood without departing from the spirit or scope of the disclosed embodiments.

If it is determined in step 516 that the area of the selected hotspot exceeds the threshold coverage percentage, then the preliminary boundaries of the selected candidate hotspot are discarded, and street geometry is used in step 518 to compute the final boundaries of the selected hotspot. In an embodiment, recommendations server 142 may establish the final boundaries of the selected candidate hotspot based on a set of popular streets that include the POIs associated with the selected hotspot. For example, recommendations server 142 may initially compute, for each street in the selected candidate hotspot, the product of the number of POIs on the street and the popularities of the POIs. Recommendations server 142 may then compute an average of the POI products across all streets, and then select those streets having a POI product above the average as the set of popular streets. In such embodiments, the selected popular streets may form the final boundaries for the selected hotspot.

In step 520, recommendations server 142 may generate a name for the selected hotspot and subsequently store the name and information associated with the selected hotspot, e.g., in location data 144. For example, the name of the selected hotspot may correspond to that of a local intersection, or street name, or local monument, park, or attraction that falls closest to a calculated centroid of the selected hotspot. In additional embodiments, the name may correspond to the most popular POI that is disposed within a threshold distance of the calculated centroid of the selected hotspot, or alternatively, the name may be based on the most popular POI associated with the selected hotspot.

Further, in an embodiment, the name of the selected hotspot may correspond to an intersection of a pair of large road segments that are disposed closest to the calculated centroid, based on, for example, Open Street Map data. However, the name of the selected hotspot is not limited to such exemplary values, and in additional embodiments, recommendations server 142 may generate the name for the selected hotspot using any additional or alternate technique.

Referring back to FIG. 5, if it is determined in step 516 that the area of the selected hotspot does not exceed the threshold coverage percentage, then the preliminary polygonal boundaries, or alternatively, a set of merged polygonal boundaries, of the selected hotspot may be established as final boundaries, and recommendations server 142 names the hotspot in step 520, as described above.

In step 522, recommendations server 142 determines whether additional candidate hotspots are available for density analysis. If additional candidate hotspots are available, then method 500 passes back to step 514, which selects an additional candidate hotspot for density analysis. However, if it is determined in step 522 that no additional candidate hotspots are available for analysis, then exemplary method 500 is completed in step 624.

In the embodiments described above, recommendations server 142 computes boundaries of hotspots within a neighborhood (e.g., the "37$^{th}$ West and Prospect West" hotspot within the "Georgetown"), and may present to a user within a corresponding web page information identifying the clustered POIs associated with the hotspot, as described above in reference to FIGS. 4A-4E. In additional embodiments, recommendations server 142 may also compute, for a neighborhood or hotspot, various measures of a corresponding quality of life associated with the neighborhood or hotspot. For example, such quality-of-life measures may be displayed to the user within region 412 of web page 400, and may include, but are not limited to, an edginess of the neighborhood or hotspot and a walkability of the neighborhood or hotspot.

Figure 6:
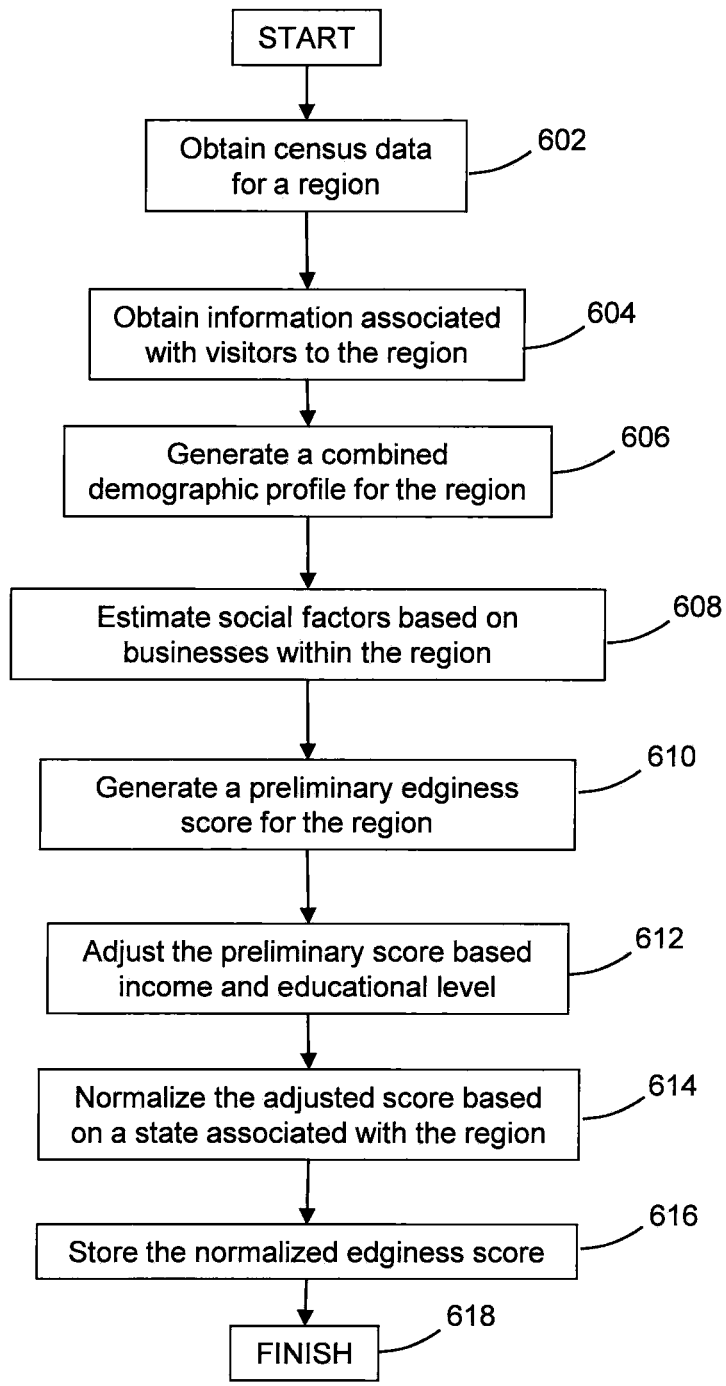
FIG. 6 is a flowchart of an exemplary method for determining a measure of an edginess of a geographic region, consistent with disclosed embodiments.

FIG. 6 illustrates an exemplary method 600 for determining a measure of an edginess of a geographic region, according to disclosed embodiments. Method 600 provides functionality that enables a recommendation server associated with a recommendations system (e.g., recommendations server 142) to compute a measure of an edginess of a neighborhood (e.g., the Georgetown neighborhood in FIG. 4C) or of a hotspot within the neighborhood (e.g., hotspots 422 of the Georgetown neighborhood in FIG. 4D) based on a demographic profile developed for the neighborhood or hotspot. For example, the edginess score for the geographic region may be transmitted by recommendations server 142 to a user device (e.g., user device 102) within one or more of steps 306 and 314 of method 300, as described above in reference to FIG. 3.

As shown in FIG. 6, recommendations server 142 may obtain census data associated with residents of a geographic region in step 602. In an embodiment, the geographic region may correspond to a neighborhood within a state, province, or other political subdivision of a nation, or alternatively, the geographic region may correspond to a hotspot located within the neighborhood.

In an embodiment, the census data may include data identifying an income and an educational level associated with residents of the region. Further, in step 602, recommendations server 142 may normalize the obtained educational and income data to conform to the boundaries of the region, and the normalized educational and income data may be included within a corresponding demographic profile of the residents of the geographic region.

In step 604, recommendations server 142 may obtain information identifying an income and an educational level associated with visitors to the geographic region. For example, such information may be obtained from logs of web sites that provide geographic information to users, such as maps and driving directions, stored within popularity data 144B. In such embodiments, the obtained log data may be extrapolated to reflect demographic trends within the population of the United States, within a particular state, or within any additional or alternate population group to generate a demographic profile of the visitors to the geographic region.

Recommendations server 142 may subsequently generate a combined resident and visitor demographic profile in step 606 based on, for example, the information associated with the residents and visitors obtained in steps 602 and 604, as described above. In an embodiment, the combination of the resident and visitor demographic profile in step 606 may include a process that weights data points by the number of residents in the geographic region and the number of visitors from other geographic regions so that it is representative of the general population of the United States, a particular state, a particular political sub-unit of a state (e.g., a city or county), and additionally or alternatively, with any desired population group.

Figure 7B:
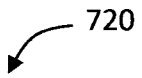

In step 608, recommendations server 142 may estimate one or more social factors for the geographic region. In an embodiment, recommendations server 142 may count businesses in step 608 that fall within a selected number of categories (e.g., Standard Industry Classifications) to estimate the social factors for the geographic region. An exemplary set of Standard Industry Classifications 700 is illustrated in FIG. 7A, although any additional or alternate set of Standard Industry Classifications may be leveraged to estimate a corresponding social factor associated with the region.

Further, in an embodiment, the numbers of specific businesses within the geographic region may be weighted to emphasize the impact of these businesses on the estimated social factors, and additionally, the overall "edginess" score for the geographic region. For example, the geographic region may be experiencing a surge in robberies of patrons of check cashing services (e.g., SIC 609903 in FIG. 7A) and pawn brokers (e.g., SIC 593229 in FIG. 7A). In such an embodiment, recommendation server may apply weight factors to the number of check cashing services and number of pawn brokers in step 608 to reflect the current surge in crime within the geographic region. These weight factors may be static and fixed in value, or alternatively, a portion of these weight factors may be adaptively determined by recommendations server 142.

Figure 7C:
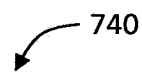

Referring back to FIG. 6, recommendations server 142 may compute a preliminary edginess factor for the region in step 610 based on, for example, the combined demographic profile generated in step 606 and the social factors estimated in step 608. In step 612, the preliminary edginess score may adjusted to account for an income and educational level characteristic of both residents to the geographic region and visitors to the geographic region. In an embodiment, the adjustment for income in step 612 may modify the preliminary edginess score for the region based on a percentage of the residents and visitors whose income that falls below a threshold value, e.g., $60,000, as outlined in table 720 of FIG. 7B. The preliminary edginess score for the region may be further adjusted in step 612 based on a percentage of the residents and visitors associated with a threshold educational level, e.g., attended college, graduated college, and/or obtained a post-graduate degree, as outlined in table 740 of FIG. 7C.

In step 614, the adjusted edginess score may be statistically normalized against similar regions in the same state, province, or other political unit. In such an embodiment, the normalized edginess score for the region becomes competitive with scores for similar regions and is calibrated for the social expectations of particular state (e.g., what is edgy for Montana may not be edgy for New York). For example, the normalized edginess score, V, may range in value from zero to ten, and may be defined as follows:

$$V=10\times(1-((\text{number of regions in the state having with edginess scores smaller than the region})/\text{number of regions in the state})).$$

Using such a definition, V*10 corresponds to a percentage of regions in a state that are edgier than the current region.

Further, in step 616, the normalized edginess score for the geographic region (e.g., the neighborhood or hotspot) may be stored within quality-of-life data store 144C of database 144, as described above with reference to FIG. 1. Further, as described above, a visual indicator of the edginess of the neighborhood or hotpot may be displayed to the user within a corresponding user interface, e.g., within region 432 of user interface 420 in FIG. 4C. Exemplary method 600 is complete in step 618.

In the embodiments described above, recommendations server 142 may compute and subsequently display indicia of an "edginess" of a neighborhood or hotspot based, for example, a demographic profile of visitors and residents and various social factors associated with businesses within the neighborhood or hotspot. The disclosed embodiments are, however, not limited to such exemplary measures of "quality of life," and in additional embodiments, recommendation server 142 may compute indicia of a walkability of a geographic region, as described below in reference to FIG. 8.

Figure 8:
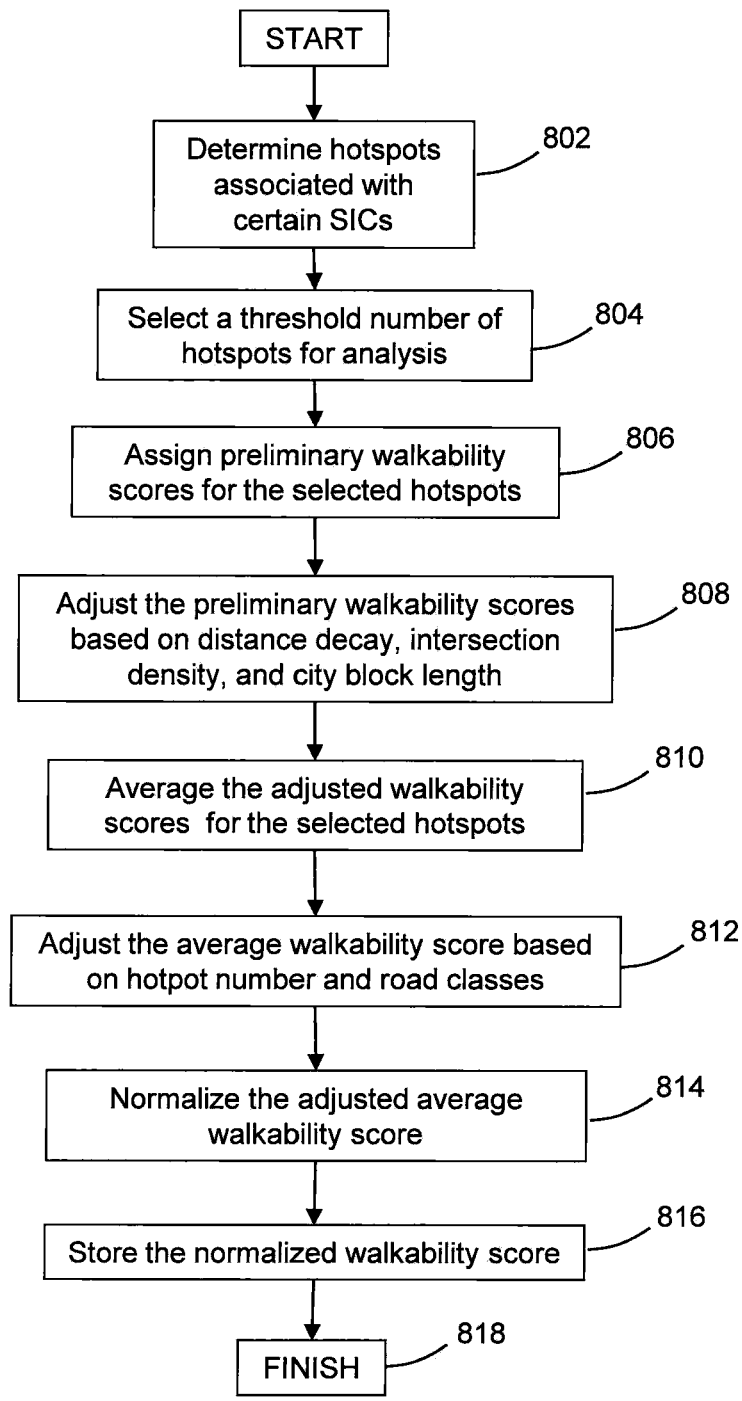
FIG. 8 is a flowchart of an exemplary method for determining a measure of a walkability of a geographic region, consistent with disclosed embodiments.

FIG. 8 illustrates an exemplary method 800 for determining a measure of an walkability of a geographic region, according to a disclosed embodiment. Method 800 may provide functionality that enables a recommendations server (e.g., recommendations server 142) to compute a measure of a walkability of a neighborhood (e.g., the Georgetown neighborhood in FIG. 4C, or of a hotspot within the neighborhood (e.g., hotspots 422 of the Georgetown neighborhood in FIG. 4D). In such embodiments, the walkability of a geographic region may be indicative of a visitor's need to drive to POIs within the region, or alternatively, utilize forms of public transportation. For example, the walkability measure for the geographic region may be transmitted by recommendations server 142 to a user device (e.g., user device 102) within one or more of steps 306 and 314 of method 300, as described above in reference to FIG. 3.

In step 802, recommendations server 142 may identify clusters of POIs as hotspots when these clustered POIs fall within a threshold distance of each other (e.g., 100 meters) and further, correspond to businesses or attractions associated with one or more predetermined categories of standard industry classifications (SIGs). For example, such categories include, but are not limited to grocery stores, restaurants, retail shopping (i.e., non-grocery stores), venues for "hanging out," banks, and parks that are associated with one or more of the following SIGs: 541105, 581209, 546102, 549915, 581208, 581222, 581206, 581301, 581228, 581219, 581304, 581224, 549915, 541103, 565101, 594712, 562101, 581209, 531104, 566101, 592102, 533101, 594201, 525104, 562105, 581228, 581203, 581304, 581214, 594201, 599969, 549915, 602101, and 799951.

Recommendations server 142 may select a threshold number of the identified hotspots for walkability analysis in step 804. For example, recommendations server 142 may determine popularity of the identified hotspots destinations for visitors who requested and obtained geographic data from a corresponding website within the past six months, for example, using logs of web sites that provide geographic information to users, such as maps and driving directions, stored in popularity data 144B of FIG. 1. For example, recommendations server 142 may order the identified hotspots in accordance with their popularity, and may select the six most popular hotspots for further analysis in step 804.

For each of the hotspots selected in step 804, recommendations server 142 may assign a preliminary walkability score in step 806 according to a schema of weights and values. For example, the schema of weights and values may be based on the category and number of POIs in the region. By way of example, FIG. 9A illustrates an exemplary schema of weights and values 900 consistent with the categories of SICs outlined above.

In step 808, recommendations server 142 may adjust the preliminary walkability scores for the selected hotspots based on tabulated values associated with distance decay, intersection density, and city-block length. In an embodiment, the preliminary walkability scores for the selected hotspots may be adjusted to account for a distance between the POIs of the hotspots and corresponding centroids of the hotspots, as outlined in table 920 of FIG. 9B.

For example, the intersection density of a hotspot may be defined as a quotient of a number of intersecting road segments associated with the hotspots (e.g., as obtained through Open Street Map road geometry data) and an area in square miles of the neighborhood that includes the hotspots. In such an embodiment, recommendations server 142 may adjust the preliminary walkability scores for the selected hotspots in step 808 to account for the intersection density of the hotspots, as outlined in table 940 of FIG. 9C.

Further, a city-block length for a hotspot may be defined as a quotient of a total length of all the roads in the hotspot (e.g., as obtained through Open Street Map road geometry data) and the number of intersections in the hotspot. In such an embodiment, recommendations server 142 may adjust the preliminary walkability scores for the selected hotspots in step 808 to account for the city-block lengths of the hotspots, as outlined in table 960 of FIG. 9D.

In step 810, recommendations server 142 may average the adjusted walkability scores over the selected hotspots, and may further adjust the average walkability score in step 812 to account for a number of the hotspots within the neighborhood and a presence of road classes within the hotspots.

For example, FIG. 9E illustrates an exemplary table 980 that may be leveraged by recommendation server 142 to adjust the average walkability score based on a number of hotspots within the neighborhood. Further, in an embodiment, recommendations server 142 may access data on specific types of roadways that are included within the selected hotspots (e.g., as obtained through Open Street Map road geometry data), and may further adjust the average adjusted walkability score in step 814, as outlined in table 990 of FIG. 9F.

Referring back to FIG. 8, in step 814, recommendations server 142 may normalize the adjusted average walkability score on a scale from zero to ten. The normalized walkability score may be stored in step 816 within quality-of-life data store 144C of FIG. 1. For example, the normalization processes in step 814 may scale the average adjusted walkability score by a theoretical maximum score, and may multiple the scale score by 10 to generate the normalized score. Exemplary method 800 is completed in step 818.

As described above, recommendations server 142 in conjunction with user device 102 may present a web page to a user, e.g., web page 400 of FIGS. 4A-4E, that enables a user to vote for or against a point of interest (POI) associated with a geographic region (e.g., a neighborhood or a hotspot) of the user's choosing. However, each month, millions of users may search for POIs obtain online driving directions to these POIs. The act of searching and then immediately obtaining directions may be predictive of a user's intent to travel to the sought POI, and as such, each intent must logically have had to be preceded by the user's evaluation and choice among alternative destinations.

In such embodiments, the click logs of these local search and directions services contain the aggregated intent to visit places that were the result of a decision among alternative destinations, and may be leveraged to generate "votes" corresponding to the POIs. For example, a search may constitute one vote, obtaining directions may constitute an additional vote, and a distance the user is intending to travel may act to amplify such votes. Such amplified votes may be aggregated into a final score (e.g. one vote corresponds to one point), and the final score may be accumulated for the POIs from month to month.

In such an embodiment, the accumulated score may be used to rank, in descending order, a set of POIs associated with a coherent category (e.g., restaurant POIs within a "Dining Out" category), and the POIs associated with the category may be considered by the user to represent a set of alternative dining choices from which he or she may choose. However, such an exemplary process may result in unnecessarily long lists of ranked POIs. For example, lists of ranked POIs beyond a threshold length (e.g., 40 to 100 POIs) lose their utility to both users and to businesses associated with the POIs.

Figure 10:
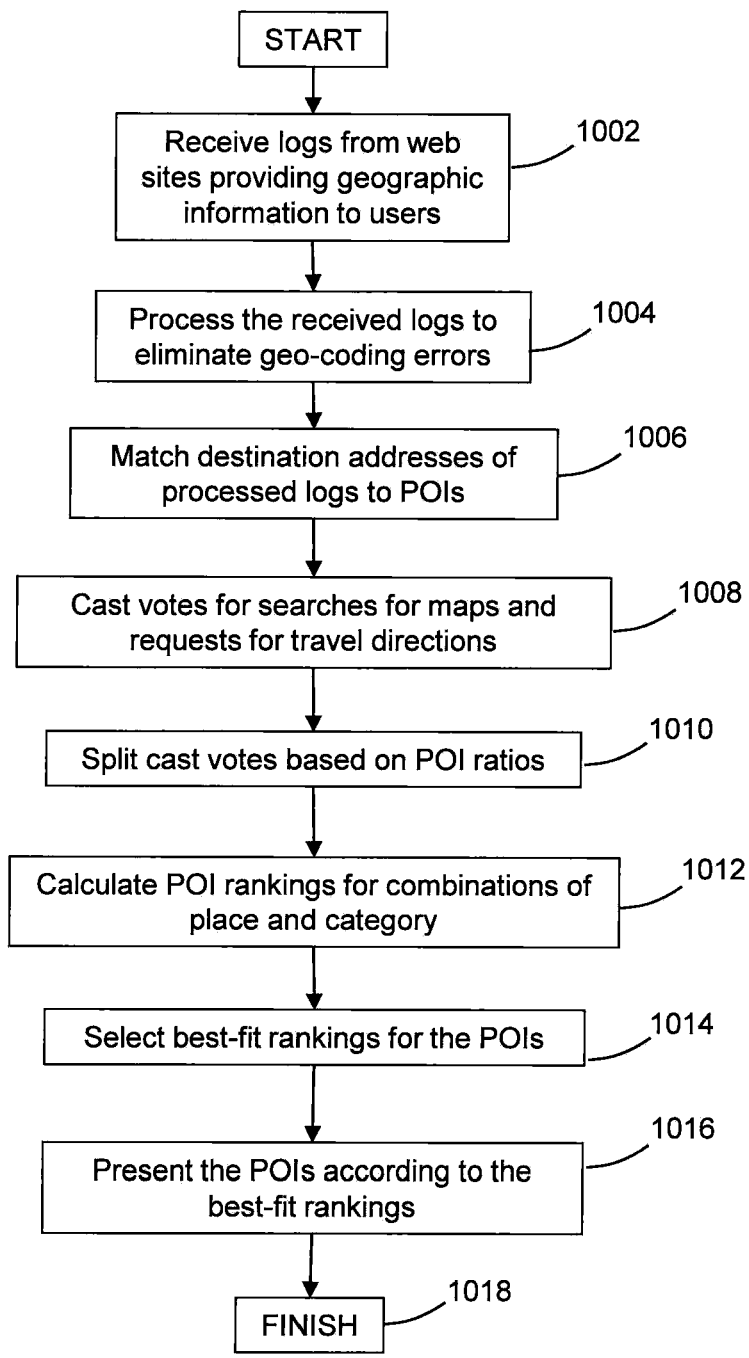
FIG. 10 is a flowchart of an exemplary method for ranking points of interest based on click logs of local search and directions services, consistent with disclosed embodiments.

FIG. 10 illustrates an exemplary method 1000 for ranking POIs based on click logs of local search and directions services, according to a disclosed embodiment. In FIG. 10, method 1000 leverages a spatial and taxonomic classification in which at least one combination of place and category ensures a particular POI appears within list of ranked POIs having less than a threshold length, e.g., forty POIs.

For example, if a restaurant is ranked $550^{th}$ in Denver, Colo., method 1000 may determine whether an alternate combination of category and place may provide a higher ranking for the restaurant, e.g., the restaurant may be the $200^{th}$ best restaurant in a neighborhood, or the $30^{th}$ best Japanese restaurant in the neighborhood, or the $3^{rd}$ best kid-friendly Japanese restaurant in a local hotspot. However, exemplary method 1000 is not limited to such exemplary POIs. In additional alternatively, the exemplary techniques of FIG. 10 may be to any point of interest that can be framed in terms of a sufficiently small (e.g., 3-100) set of "rivalrous" alternatives that persist over time as an object of user choice, which include, but are not limited to, menu items in a restaurant, books on some subject, driving routes, and periodic events such as farmers markets or Fall Colors.

In FIG. 10, a recommendations server (e.g., recommendations server 142 of FIG. 1) may receive logs of web sites that provide geographic information to users, such as maps and driving directions, in step 1002. For example, such logs may be received on a daily basis, on a periodic basis, or according to any additional or alternate time schedule appropriate to recommendations server 142 and the web sites. Further, in an embodiment, the logs may include data records that include destination locations associated with a corresponding plurality of searches for maps and driving directions executed by the general population.

In step 1004, the received logs may be processed to eliminate those data records having destination locations the corresponding to zip codes or city geo-codes (e.g., WOEID). For example, the processing in step 1004 may matching geospatial coordinates (e.g., latitude and longitude) associated with the destination locations against corresponding zip codes and/or city geo-codes to identify data records for elimination. In such embodiments, the elimination of data records associated with city and/or zip codes ensures that the received logs do not include searches for maps or travel directions between cities, e.g., Denver, Colo. to New York, N.Y.

In step 1006, recommendations server 142 may match the destination locations associated with the remaining data records of the logs to corresponding points of interest (POIs). As described above, the processing in step 1006 may leverage geo-spatial coordinates associated with the destination location and POIs to execute the match, or alternatively, the data records of the received logs may include additional information explicitly specifying a POI associated with a corresponding destination location, e.g., a user may have specified a POI as an input to the mapping and direction web site.

In an embodiment, the processing of step 1006 may be unable to identify a POI associated with a corresponding destination location. For example, when searching for a map or a set of travel directions, a user may have only specified an address, but not any corresponding specific POI. In such embodiments, recommendations server 142 may determine a popularity ratio of a number of POIs associated with the destination address based on a corresponding search history. For example, a first POI (e.g., $POI_1$) may be associated with thirty searches, and a second POI (e.g., $POI_2$) may be associated with fifty searches. Thus, the ratio of $POI_1:POI_2$ is 3:5, and such computed ratios may be used to split cast votes between potential POIs, as discussed below.

In step 1008, recommendations server 142 casts one vote for a search, and one vote for a corresponding request for travel directions. Based on a travel distance associated with the requested travel direction, recommendations server 142 may apply an acceleration factor to the vote associated with the travel direction. For example, the acceleration factor may be set to 1.5 for travel distances from ten to twenty miles, to 2.0 for travel distances between twenty and thirty miles, and to 3.0 for travel distances in excess of thirty miles. However, in additional embodiments, any additional or alternate acceleration travel factor may be applied to the votes cast for the search and/or the request for travel directions, without departing from the spirit or scope of the disclosed embodiments.

As discussed above, recommendations server 142 may be unable to identify a particular POI associated with a corresponding destination location. In such an embodiment, in step 1010, recommendation server 142 may split the total votes cast for a destination location in accordance with the ratio or ratios computed above in step 1006.

In step 1012, recommendations server 142 may calculate a rank associated with each POI in every applicable combination of place and category, and select a ranking associated with one of the combinations of place and category as "best fit ranking" in step 1014. For example, the best-fit ranking for a POI may be defined as the top two combinations of place and category in which the corresponding rank is lowest and a number of other competitors in that ranking is less than three. Recommendations server 142 may subsequently display the POI in its corresponding best-fit ranking in step 1016, and method 1000 may be completed in step 1018.

In the embodiments described above, method 1000 frames requests for maps associated with a POI and directions for travel to the POI as the casting of votes for a quality of that POI. Further, the exemplary methods of FIG. 10 analyze user behavior to progressively strengthen a vote for a POI, and may solve the problem of knowing how to cast votes when only the destination address is known and more than one POI is located at that address. Further, method 1000 may exclude geo-coding errors in POI databases by matching destination addresses against city centroid and zip centroid databases, and dynamically define a scope of ranking by auto-scaling the two dimensions of space and taxonomy, such that a ranking of a POI is sufficiently small of relevance to various stakeholders, such as users and the local businesses.

In the embodiments described above, hierarchical relationships between various domains are used to provide and improve rankings associated with points of interest (POIs). For example, POI rankings may be provided within neighborhoods of dense urban areas, which themselves may be subsets of states, provides, or other political subdivisions of a nation, while a hotspot may include a collection of individual points within such neighborhoods and may be associated with corresponding parking profiles. Further, for example, using the exemplary processes of FIG. 14, the ranking of a POI may be optimized through the scaling within dimensions of time and space.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. A computer-implemented method, comprising:

determining, using at least one processor, initial rankings for a plurality of points of interest associated with a geographic region;

obtaining voting information associated with at least a subset of the points of interest, the voting information comprising votes provided by at least one of a user of the user device or a member of a social network associated with the user;

obtaining information comprising destination addresses associated with a plurality of queries for geographic information;

identifying, using the at least one processor, matches between the destination addresses and corresponding ones of the points of interest within the geographic region; and calculating, using the at least one processor, modified rankings for the points of interest based on at least the initial rankings, the voting information, and the identified matches, the calculating comprising:

identifying first and second points of interest that match a corresponding one of the destination addresses, the first point of interest being associated with a first portion of the queries, and the second point of interest being associated with a second portion of the queries;

based on the obtained voting information, identifying one or more of the votes associated with the first and second points of interest;

assigning the identified votes to corresponding ones of the first and second points of interest in accordance with a ratio between the first and second portions of the queries; and calculating the modified rankings for the first and second points of interest based on the votes assigned to the first and second points of interest, the modified rankings comprising at least one of (i) a first modified ranking for the first point of interest that exceeds a corresponding initial ranking or (ii) a second modified ranking for the second point of interest that falls below a corresponding initial ranking.

2. The method of claim 1, further comprising generating an instruction to transmit at least the modified rankings of the points of interest to the user device.

3. The method of claim 1, further comprising selecting the plurality of points of interest based on geographic information received from the user device.

4. The method of claim 1, further comprising:
obtaining popularity data associated with the points of interest, the popularity data indicating popularities of corresponding ones of the points of interest with at least one of a resident or a visitor to the geographic region; and
determining the initial rankings for the points of interest based on the obtained popularity data.

5. The method of claim 1, wherein:
the geographic region comprises a neighborhood; and
the neighborhood comprises one or more clusters of the points of interest.

6. The method of claim 5, further comprising:
determining popularities associated with corresponding ones of the clusters, based on popularity data associated with the points of interest; and
identifying one or more hotspots within the neighborhood based on at least the determined popularities, the hotspots being associated with corresponding ones of the clustered points of interest;
computing initial boundaries for the hotspots using a flood-fill algorithm.

7. The method of claim 6, further comprising:
determining, for a corresponding one of the hotspots, whether an area enclosed by the initial boundaries exceeds a threshold percentage of an area of the neighborhood;
when the enclosed area fails to exceed the threshold percentage, establishing the initial boundaries as final boundaries for the corresponding hotspot; and
generating an identifier for the corresponding hotspot, based on at least one of (i) the popularity data or (ii) information identifying one or more streets disposed within the final boundaries.

8. The method of claim 7, further comprising, when the enclosed area exceeds the threshold percentage, computing the final boundaries for the corresponding hotspot based on geographic locations of the corresponding points of interest.

9. The method of claim 6, further comprising:
determining whether a first one of the hotspots is disposed proximate to a second one of the hotspots; and
merging the initial boundaries of the first and second hotspots, when the first hotspot is disposed proximate to the second hotspot.

10. The method of claim 1, wherein:
the geographic region corresponds to a hotspot of a neighborhood; and
the hotspot is associated with a cluster of the points of interest.

11. The method of claim 10, further comprising:
generating a preliminary edginess score for the hotspot, based a demographic profile associated with the hotspot and a social factor associated with a corresponding one of the points of interest within the hotspot;
adjusting the preliminary edginess score to account for at least one of an income level or an educational level of residents and visitors to the hotspot; and
generating an instruction to transmit the adjusted edginess score to the user device.

12. The method of claim 11, further comprising normalizing the adjusted edginess score based on a political unit associated with the hotspot.

13. The method of claim 10, further comprising:
generating a preliminary walkability score for the hotspot, based at least the cluster of points of interest;
adjusting the preliminary walkability score based on at least one of a distance decay, an intersection density, or a city block length;
modifying the adjusted walkability score based on at least one of a number of hotspots within the neighborhood or a class of roads enclosed within the hotspot; and
generating an instruction to transmit the modified walkability score to the user device.

14. The method of claim 13, wherein generating the preliminary walkability score comprises generating preliminary walkability score based on categories associated with corresponding ones of the clustered points of interest, the categories being associated with standard industry classifications.

15. The method of claim 1, further comprising:
generating ranking information for at least one of the points of interest based on corresponding numbers of matched destination addresses, the rankings specifying combinations of categories associated with the point of interest and geographic regions associated with the points of interest; and
selecting at least a portion of the generated ranking information for presenting the point of interest to a user of the user device.

16. The method of claim 15, wherein the queries comprise searches for geographic information and requests for travel directions, and the method further comprises:
assigning weights to corresponding ones of the searches and requests; and
generating the ranking information for the at least one of the points of interest based on corresponding weighted numbers of the matched destination addresses.

17. The method of claim 16, further comprising assigning acceleration factors to corresponding ones of the weighted requests, the acceleration factors being based on a travel distance associated with the requested travel directions.

18. An apparatus, comprising:
a storage device; and
at least one processor coupled to the storage device, wherein the storage device stores a program for controlling the at least one processor, and wherein the at least one processor, being operative with the program, is configured to:
determine initial rankings for a plurality of points of interest associated with a geographic region;
obtain voting information associated with at least a subset of the points of interest, the voting information comprising votes provided by at least one of a user of the user device or a member of a social network associated with the user;
obtain information comprising destination addresses associated with a plurality of queries for geographic information;
identify matches between the destination addresses and corresponding ones of the points of interest within the geographic region; and
calculate modified rankings for the points of interest based on at least the initial rankings, the voting information, and the identified matches, the processor being further configured to:
identify first and second points of interest that match a corresponding one of the destination addresses, the first point of interest being associated with a first portion of the queries, and the second point of interest being associated with a second portion of the queries;

based on the obtained voting information, identify one or more of the votes associated with the first and second points of interest;

assign the identified votes to corresponding ones of the first and second points of interest in accordance with a ratio between the first and second portions of the queries; and calculate the modified rankings for the first and second points of interest based on the votes assigned to the first and second points of interest, the modified rankings comprising at least one of (i) a first modified ranking for the first point of interest that exceeds a corresponding initial ranking or (ii) a second modified ranking for the second point of interest that falls below a corresponding initial ranking.

19. The apparatus of claim 18, wherein the processor is further configured to generate an instruction to transmit at least the modified rankings of the points of interest to the user device.

20. The apparatus of claim 18, wherein the processor is further configured to select the plurality of points of interest based on geographic information received from the user device.

21. The apparatus of claim 18, wherein the processor is further configured to:
obtain popularity data associated with the points of interest, the popularity data indicating popularities of corresponding ones of the points of interest with at least one of a resident or a visitor to the geographic region; and
determine the initial rankings for the points of interest based on the obtained popularity data.

22. The apparatus of claim 19, wherein:
the geographic region comprises a neighborhood; and
the neighborhood comprises one or more clusters of the points of interest.

23. The apparatus of claim 22, wherein the processor is further configured to:
determine popularities associated with corresponding ones of the clusters, based on popularity data associated with the points of interest; and
identify one or more hotspots within the neighborhood based on at least the determined popularities, the hotspots being associated with corresponding ones of the clustered points of interest;
compute initial boundaries for the hotspots using a flood-fill algorithm.

24. The apparatus of claim 23, wherein the processor is further configured to:
determine, for a corresponding one of the hotspots, whether an area enclosed by the initial boundaries exceeds a threshold percentage of an area of the neighborhood;
when the enclosed area fails to exceed the threshold percentage, establish the initial boundaries as final boundaries for the corresponding hotspot; and
generate an identifier for the corresponding hotspot, based on at least one of (i) the popularity data or (ii) information identifying one or more streets disposed within the final boundaries.

25. The apparatus of claim 24, wherein the processor is further configured to, when the enclosed area exceeds the threshold percentage, compute the final boundaries for the corresponding hotspot based on geographic locations of the corresponding points of interest.

26. The apparatus of claim 24, wherein the processor is further configured to:
determine whether a first one of the hotspots is disposed proximate to a second one of the hotspots; and
merge the initial boundaries of the first and second hotspots, when the first hotspot is disposed proximate to the second hotspot.

27. The apparatus of claim 18, wherein:
the geographic region corresponds to a hotspot of a neighborhood; and
the hotspot is associated with a cluster of the points of interest.

28. The apparatus of claim 27, wherein the processor is further configured to:
generate a preliminary edginess score for the hotspot, based a demographic profile associated with the hotspot and a social factor associated with a corresponding one of the points of interest within the hotspot;
adjust the preliminary edginess score to account for at least one of an income level or an educational level of residents and visitors to the hotspot; and
generate an instruction to transmit the adjusted edginess score to the user device.

29. The apparatus of claim 28, wherein the processor is further configured to normalize the adjusted edginess score based on a political unit associated with the hotspot.

30. The apparatus of claim 27, wherein the processor is further configured to:
generate a preliminary walkability score for the hotspot, based at least the cluster of points of interest;
adjust the preliminary walkability score based on at least one of a distance decay, an intersection density, or a city block length;
modify the adjusted walkability score based on at least one of a number of hotspots within the neighborhood or a class of roads enclosed within the hotspot; and
generate an instruction to transmit the modified walkability score to the user device.

31. The apparatus of claim 30, wherein the processor is further configured to generate the preliminary walkability score based on categories associated with corresponding ones of the clustered points of interest, the categories being associated with standard industry classifications.

32. The apparatus of claim 18, wherein the processor is further configured to:
generate ranking information for at least one of the points of interest based on corresponding numbers of matched destination addresses, the rankings specifying combinations of categories associated with the point of interest and geographic regions associated with the points of interest; and
select at least a portion of the generated ranking information for presenting the point of interest to a user of the user device.

33. The apparatus of claim 32, wherein the queries comprise searches for geographic information and requests for travel directions, and the processor is further configured to:
assign weights to corresponding ones of the searches and requests; and
generate the ranking information for the at least one of the points of interest based on corresponding weighted numbers of the matched destination addresses.

34. The apparatus of claim 33, wherein the processor is further configured to assign acceleration factors to corresponding ones of the weighted requests, the acceleration factors being based on a travel distance associated with the requested travel directions.

35. A tangible, non-transitory computer readable medium storing instructions that, when executed by at least one processor, cause the at least one processor to perform a method, comprising:

determining initial rankings for a plurality of points of interest associated with a geographic region;

obtaining voting information associated with at least a subset of the points of interest, the voting information comprising votes provided by at least one of a user of the user device or a member of a social network associated with the user;

obtaining information comprising destination addresses associated with a plurality of queries for geographic information;

identifying, using the at least one processor, matches between the destination addresses and corresponding ones of the points of interest within the geographic region; and calculating modified rankings for the points of interest based on at least the initial rankings, the voting information, and the identified rankings, the calculating comprising:

identifying first and second points of interest that match a corresponding one of the destination addresses, the first point of interest being associated with a first portion of the queries, and the second point of interest being associated with a second portion of the queries;

based on the obtained voting information, identifying one or more of the votes associated with the first and second points of interest;

assigning the identified votes to corresponding ones of the first and second points of interest in accordance with a ratio between the first and second portions of the queries; and calculating the modified rankings for the first and second points of interest based on the votes assigned to the first and second points of interest, the modified rankings comprising at least one of (i) a first modified ranking for the first point of interest that exceeds a corresponding initial ranking or (ii) a second modified ranking for the second point of interest that falls below a corresponding initial ranking.

\* \* \* \* \*